US008224819B2

(12) United States Patent
Sakai et al.

(10) Patent No.: US 8,224,819 B2
(45) Date of Patent: Jul. 17, 2012

(54) APPARATUS, METHOD, AND PROGRAM FOR PROCESSING INFORMATION

(75) Inventors: Nobuhiro Sakai, Kanagawa (JP); Katsuya Kondo, Kanagawa (JP); Yasumichi Koketsu, Kanagawa (JP); Tatsuya Kubota, Kanagawa (JP); Satoru Inoue, Kanagawa (JP); Takuji Moriya, Kanagawa (JP)

(73) Assignee: Sony Corporation, Tokyo (JP)

( * ) Notice: Subject to any disclaimer, the term of this patent is extended or adjusted under 35 U.S.C. 154(b) by 955 days.

(21) Appl. No.: 11/208,657

(22) Filed: Aug. 23, 2005

(65) Prior Publication Data
US 2006/0059200 A1    Mar. 16, 2006

(30) Foreign Application Priority Data

Aug. 24, 2004 (JP) ............................ P2004-243552

(51) Int. Cl.
*G06F 7/00*     (2006.01)
*G06F 17/30*    (2006.01)
(52) U.S. Cl. ........................... 707/736; 707/758
(58) Field of Classification Search .................. 707/736, 707/758
See application file for complete search history.

(56) References Cited

U.S. PATENT DOCUMENTS

| 2004/0267819 A1* | 12/2004 | Shinkai et al. ............ 707/104.1 |
| 2005/0008329 A1* | 1/2005 | Suzuki et al. ................ 386/52 |
| 2005/0149579 A1* | 7/2005 | Tsubaki et al. .............. 707/200 |
| 2005/0183018 A1* | 8/2005 | Shinkai et al. ............... 715/723 |
| 2006/0098941 A1* | 5/2006 | Abe et al. .................... 386/52 |

FOREIGN PATENT DOCUMENTS

| JP | 2000-149502 | * | 5/2000 | .................. 707/736 |
| JP | 02000149502 A | * | 5/2000 | |
| JP | 2002-158972 | | 5/2002 | |

* cited by examiner

*Primary Examiner* — Kuen Lu
*Assistant Examiner* — Hexing Liu
(74) *Attorney, Agent, or Firm* — Oblon, Spivak, McClelland, Maier & Neustadt, L.L.P.

(57) ABSTRACT

An information processing method for an information processing apparatus to process content data, including generating content data information associated with content data; and registering information associated with the content data generated in the content data information generation step, in an edit list indicating a result of editing of the content data. The apparatus makes it possible to manage a large number of image data in the form of an editing result and easily manage a large number of image data having complicated relationships. A clip data detector of an editing apparatus detects clip data including image data and audio data supplied from the outside. The clip data detector extracts meta data associated with detected clip data and supplies it to a sub clip processing unit. A sub clip information generator of the sub clip processing unit generates sub clip information based on the meta data and supplies the generated sub clip information to a sub clip information registration unit. The sub clip information registration unit registers the sub clip information generated by there sub clip information generator in an edit list stored in an edit list memory.

7 Claims, 29 Drawing Sheets

FIG. 3

```
1  <?xml version="1.0" encoding="UTF-8"?>
2  <smil xmlns="urn:schemas-professionalDisc:edl:editList">
3    <head>
4      <metadata type="Meta">
5        <!-- nonrealtime meta -->
6        <NRMeta xmlns="urn:schemas:professionalDisc:nrt">
7          <ref src="E0002M01.XML"/>
8        </NRMeta>
9      </metadata>
10   </head>
11   <body>
12     <par>
13       <!-- Clip1 -->
14       <ref
15 src="urn:smpte:umid:060A2B3401010105010D1213000000FEDCBA9876543210"
16 type="edlDoc" begin="smpte-30=00:00:00" clipBegin="smpte-
17 30=00:10:00:00"/>
18       <!-- Clip2 -->
19       <ref
20 src="urn:smpte:umid:060A2B3401010105010D1213000000EDCBA9876543210F"
21 type="edlDoc" begin="smpte-30=00:10:00" clipBegin="smpte-
22 30=00:03:30:00"/>
23     </par>
24   </body>
25 </smil>
```

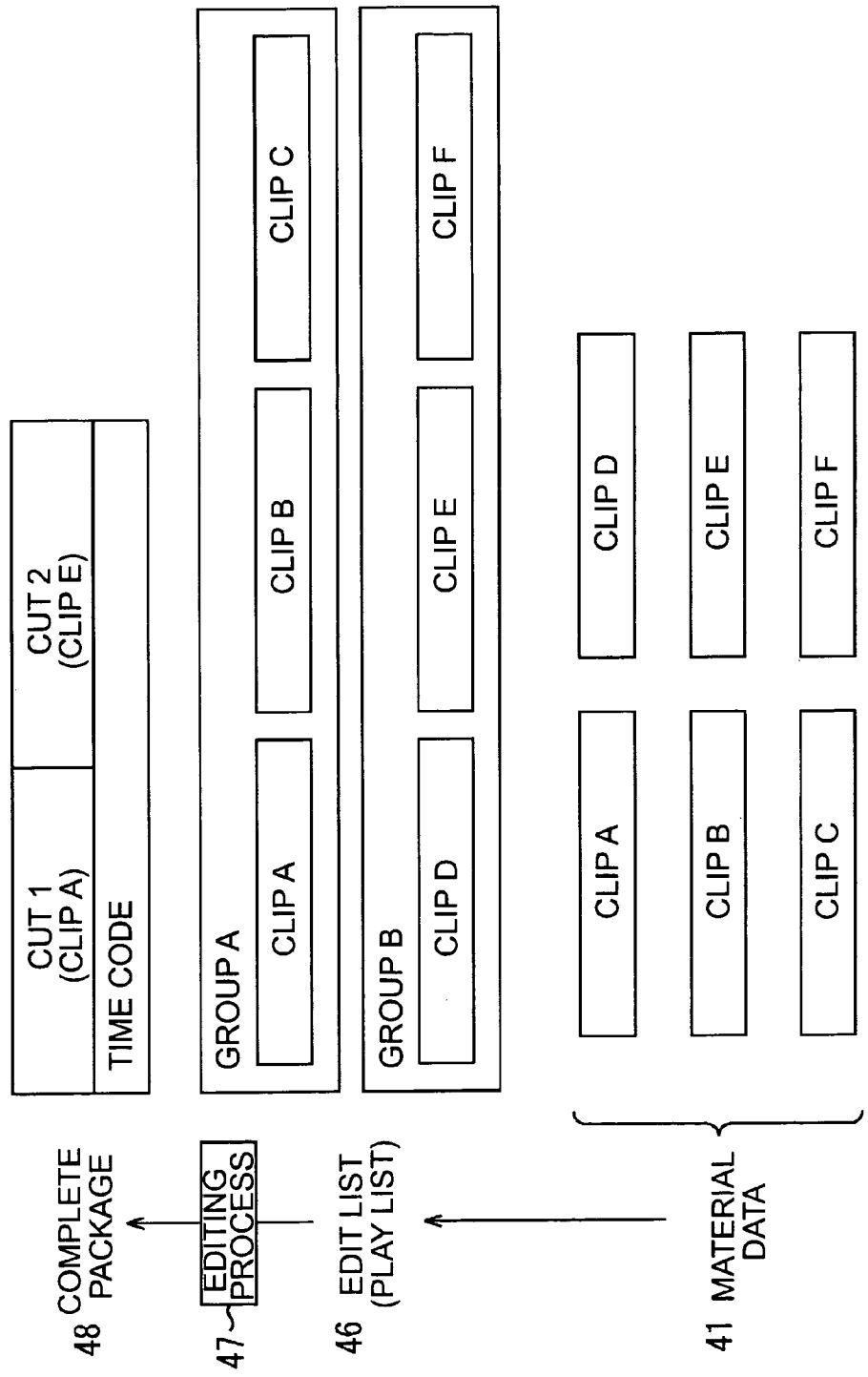

FIG. 17

```
1  <?xml version="1.0" encoding="UTF-8"?>
2  <discinfo xmlns="urn:schemas-professionalDisc:discinfo">
3      <history>
4          <editlist id="E0001" ftc="smpte-30-drop=00:00:00:15" />
5          <tape id="C0003" ftc="smpte-30-drop=00:02:23:12" />
6          <editlist id="E0004" ftc="smpte-30-drop=00:00:10:02" />
7      </history>
8  </discinfo>
```

APPARATUS, METHOD, AND PROGRAM FOR PROCESSING INFORMATION

CROSS-REFERENCE TO RELATED APPLICATIONS

The present application claims priority to Japanese Application No. P2004-243552, filed Aug. 24, 2004, the entire contents of which are incorporated herein by reference.

BACKGROUND OF THE INVENTION

1. Field of the Invention

The present invention relates to an apparatus, a method, and a program for processing information, and more particularly to an apparatus, a method, and a program for processing information, capable of easily managing a large number of image data having complicated relationships.

2. Discussion of the Background

In a conventional image pickup apparatus such as a digital camera, image data acquired via a shooting process is managed by storing the image data in a particular folder on a storage medium. An increase in storage capacity of storage media achieved in recent years makes it possible to store a large number of image data. However, this makes it difficult for a user to manage image data.

To avoid the above problem, it has been proposed to change a folder in which to record image data obtained via a shooting process or assign additional information to the image data thereby automatically grouping the image data. See, e.g., Japanese Unexamined Patent Application Publication No. 2002-191010.

However, when large-size image data is produced by using a content production system as in a production of television programs, the image data is moving image data with a large data size, and the image data includes a large number of shots compared with image data produced for private use. Besides, the shooting process is very complicated compared with a process of shooting a movie for private use, and thus complicated management of image data (moving image data) acquired via shooting is needed.

In general, the shooting operation in such a large system is performed in accordance with a schedule table or a scenario. However, the shooting operation is not necessarily performed in the same order as the scenario, but the shooting order is often changed depending on the shooting conditions or the convenience of subjects. Thus, in some cases, cuts of scenes which are not adjacent to each other in the scenario are shot in successive shooting operations, or a plurality of scenes are concurrently shot. In some cases, the same cut of the scenario is shot a plurality of times. Conversely, in some cases, a plurality of cuts are shot in the same shooting operation (a plurality of cuts are produced from one clip data). In general, a shooting schedule is made in advance. However, the shooting schedule is often changed before or during the shooting operation depending on the shooting conditions.

In the production of television programs or the like in which a large number of image data (clip data) with a large size are produced during the complicated shooting operation, very complicated management of data is necessary compared with image data for private use. In the above-described conventional management method in which image data are managed by simply grouping them, it is difficult to manage the data well.

In such a conventional management method based on a simple grouping technique, it is difficult to easily identify image data that corresponds to a particular cut of a particular scene. Furthermore, it is difficult to identify specific parts of the whole clip data intended to be employed. When a large number of image data are produced by performing the shooting operation a large number of times, the simple grouping of image data according to the convention technique does not allow it to easily identify which image data is located before or after another image data. When such image data is played back continuously, the conventional technique only allows it to play back the image data in the same order as the shooting order.

SUMMARY OF THE INVENTION

In view of the above, an object of the present invention is to provide a technique that allows clips obtained via shooting operations to be recorded in a nondestructively edited form that allows a user to manage a plurality of image data in an arbitrarily edited form and thus allows the user to easily manage a large number of image data having complicated relationships.

The present invention provides a first information processing apparatus comprising content data information generation means for generating information associated with content data, and content data information registration means for registering information associated with the content data generated by the content data information generation means, in an edit list indicating a result of editing of the content data.

The information processing apparatus may further include edit list storage means for storing the edit list, and the content data information registration means may additionally register information associated with the content data in the edit list stored in the edit list storage means.

The content data information generation means may comprise content data identification information generation means for generating content data identification information identifying the content data, time code information generation means for generating time code information indicating a time code for use in the edit list, the time code being assigned to the content data, and essence mark information generation means for generating information representing an essence mark that is meta data information added to a frame image of the content data, wherein the content data information registration means may additionally register, in the edit list, content data information including the content data identification information generated by the content data identification information generation means, the time code information generated by the time code information generation means, and the essence mark information generated by the essence mark information generation means.

The information processing apparatus may further include essence mark input acceptance means for accepting inputting of the essence mark, wherein the essence mark information generation means may generate information representing the essence mark accepted by the essence mark input acceptance means.

The information processing apparatus may further include recording means for recording information on a storage medium, wherein the recording means may record, on the storage medium, content data whose associated information has been registered in the edit list by the content data information registration means.

The recording means may further record, on the storage medium, the edit list in which information associated with the content data is registered.

The information processing apparatus may further include image capture means for capturing an image of a subject, wherein the content data information generation means may generate information associated with content data obtained via the image capturing performed by the image capture means.

The information processing apparatus may further include data input acceptance means for accepting inputting of the content data from the outside, wherein the content data information generation means may generate information associated with the content data accepted by the data input acceptance means.

The present invention provides a first information processing method comprising the steps of generating content data information associated with content data, and additionally registering information associated with the content data generated in the content data information generation step, in an edit list indicating a result of editing of the content data.

The present invention provides a first program comprising the steps of generating content data information associated with content data, and additionally registering information associated with the content data generated in the content data information generation step, in an edit list indicating a result of editing of the content data.

The present invention provides a second information processing apparatus comprising grouping list editing means for editing, in accordance with an edit list indicating a result of editing of the content data, a grouping list indicating groups of the content data included in the result of editing indicated by the edit list.

The second information processing apparatus may further comprise edit list reading means for reading the edit list recorded on a storage medium, wherein the grouping list editing means may edit the grouping list in accordance with the edit list read by the reading means from the storage medium.

The second information processing apparatus may further comprise edit list designation command accepting means for accepting inputting of a command designating an edit list of a plurality of edit lists to be used in editing of the grouping list performed by the grouping list editing means.

The second information processing apparatus may further comprise group designation command accepting means for accepting inputting of a command designating a group in which to register the content data included in the result of editing indicated by the edit list, from a plurality of groups included in the grouping list.

The grouping list editing means may additionally register the content data in an existing group if the existing group is designated by the command accepted by the group designation command accepting means.

If a new group is designated by the command accepted by the group designation command accepting means, the grouping list editing means may generate the new group and register the content data in the new group.

The second information processing apparatus may further comprise grouping list recording means for recording the grouping list edited by the grouping list editing means on a storage medium.

The second information processing apparatus may further comprise grouping list outputting means for outputting the grouping list edited by the grouping list editing means to the outside.

The present invention provides a second information processing method comprising the step of editing, in accordance with an edit list indicating a result of editing of the content data, a grouping list indicating groups of the content data included in the result of editing indicated by the edit list.

The present invention provides a second program comprising the step of editing, in accordance with an edit list indicating a result of editing of the content data, a grouping list indicating groups of the content data included in the result of editing indicated by the edit list.

In the first information processing apparatus, the first information processing method, and the first program according to the present invention, information associated with content data is produced, and the resultant information associated with the content data is additionally registered in an edit list indicating a result of editing of the content data.

In the second information processing apparatus, the second information processing method, and the second program according to the present invention, in accordance with an edit list indicating a result of editing of content data, a grouping list is edited so as to indicate groups of the content data included in the result of editing indicated by the edit list.

The present invention makes it possible for a user to easily mange a large number of image data having complicated relationships.

According to an aspect of the present invention, there is provided an information processing apparatus for processing content data, including: (1) an input unit configured to obtain content data, wherein the content data includes data corresponding to at least one image; (2) a subclip information generator configured to generate, based on the content data, information that identifies the content data, wherein the generated information includes a globally unique identifier; (3) a subclip information registration unit configured to register the generated information in an edit list; and (4) an edit list memory configured to store the edit list separately from the content data.

According to another aspect of the present invention, there is provided a method of processing content data, including: (1) obtaining content data, wherein the content data includes data corresponding to at least one image; (2) generating, based on the content data, information that identifies the content data, wherein the generated information includes a globally unique identifier; (3) registering the generated information in an edit list; and (4) storing the edit list separately from the content data.

According to another aspect of the present invention, there is provided a method of editing image data, including: (1) obtaining at least one edit list from a first memory device, each of the at least one edit list including subclip information identifying respective content data, the subclip information including a globally unique identifier of the respective content data; (2) obtaining the respective content data from a second memory device; and (3) arranging the respective content data, based on the obtained subclip information, to generate a complete data package.

According to another aspect of the present invention, there is provided a method of managing content data, including: (1) generating a plurality of edit lists, each edit list including information that identifies corresponding content data, wherein the generated information includes a globally unique identifier; (2) storing each edit list separately from the corresponding content data; and (3) generating, based on the plurality of edit lists, a grouping list including selected content data identified in the plurality of edit lists.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which like reference numerals refer to identical or corresponding parts throughout the several views, and in which:

FIG. 3 is a diagram showing a specific example of an edit list;

FIG. 4 is a diagram showing a grouping list;

FIG. 17 is a diagram showing a specific example of a disk information file shown in FIG. 14;

DESCRIPTION OF THE PREFERRED EMBODIMENTS

Before embodiments of the present invention are described, correspondence between specific examples of parts/steps in the embodiments and those in the respective claims is described. Note that the purpose of the following description is to indicate that specific examples corresponding to the respective claims are described in the embodiments, and thus the purpose of the following description is not to limit specific examples of the respective claims to those described below. That is, there can be a part/step that is not described in the following description of the correspondence but that corresponds to a part/step of a particular claim. Conversely, an example of a part/step, which is described in the following description as corresponding to a particular claim, can correspond to a part/step of another claim.

Also note that it should be understood that some examples described in the embodiments can correspond to no claims. In other words, there can be a claim that correspond to an example described in the embodiments but that is not included in the current claims, that is, there can be a future claim presented by means of division or amendment of the present application.

Figure 1:
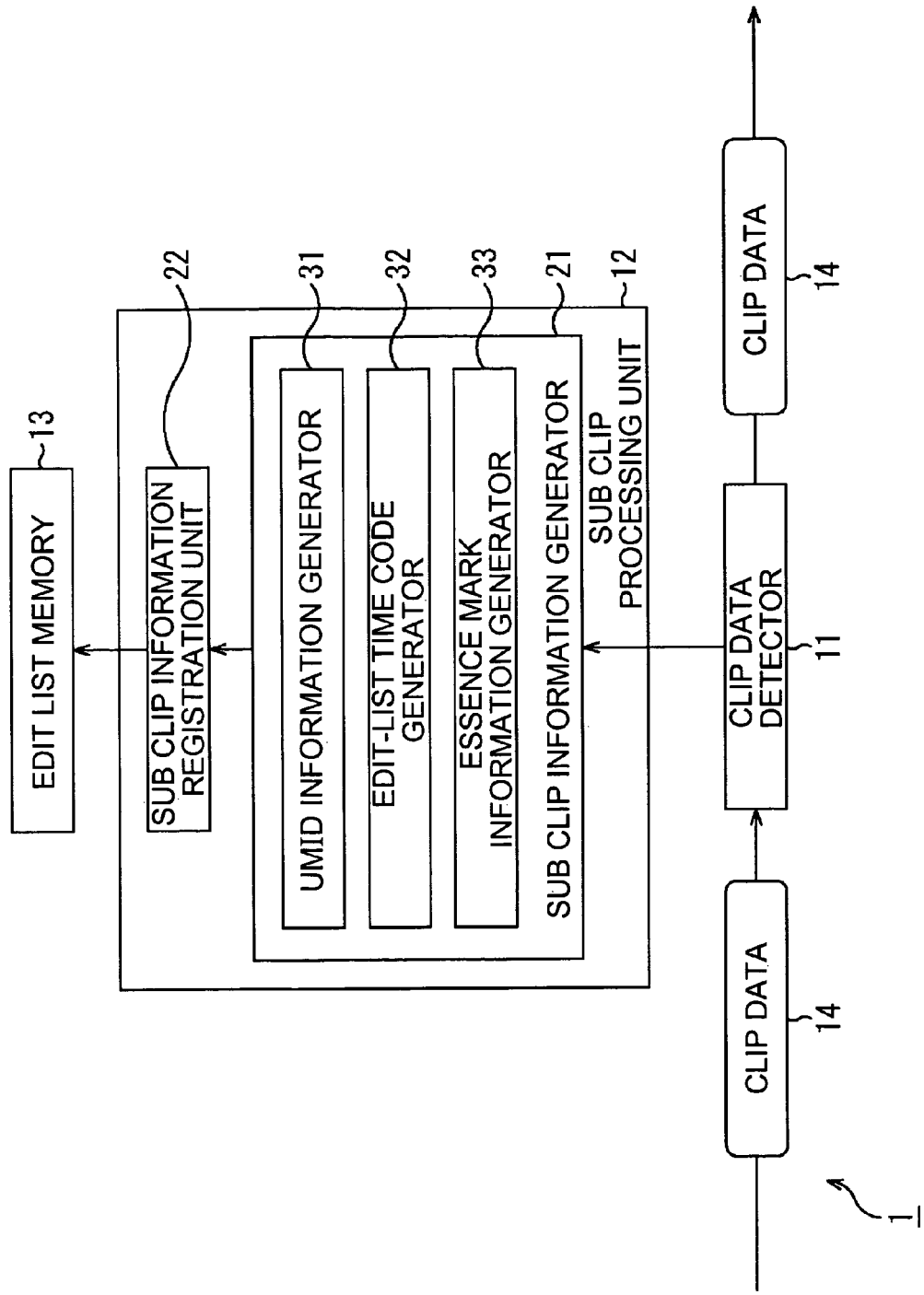
FIG. 1 is a block diagram showing an example of a configuration of an editing apparatus according to the present invention.

The present invention provides a first information processing apparatus (for example, an editing apparatus shown in FIG. 1) for processing content data (for example, clip data shown in FIG. 1). The first information processing apparatus comprises content data information generation means (for example, sub clip information generator shown in FIG. 1) for generating information associated with content data, and content data information registration means (for example, a sub clip information registration unit shown in FIG. 1) for additionally registering information associated with the content data generated by the content data information generation means, in an edit list (for example, an edit list shown in FIG. 2) indicating a result of editing of the content data.

The first information processing apparatus may further comprise edit list storage means (for example, an edit list memory shown in FIG. 1) for storing the edit list, and the content data information registration means may additionally register information associated with the content data in the edit list stored in the edit list storage means.

The content data information generation means may comprise content data identification information generation means (for example, a UMID information generator shown in FIG. 1) for generating content data identification information (for example, a UMID) identifying the content data, time code information generation means (for example, an edit-list time code generator shown in FIG. 1) for generating time code information indicating a time code for use in the edit list (for example, a time code shown in FIG. 2 for use in the edit list), the time code being assigned to the content data, and essence mark information generation means (for example, an essence mark information generator shown in FIG. 1) for generating information representing an essence mark (for example, AIN or AOUT shown in FIG. 2) that is meta data information added to a frame image of the content data, wherein the content data information registration means additionally registers, in the edit list, content data information including the content data identification information generated by the content data identification information generation means, the time code information generated by the time code information generation means, and the essence mark information generated by the essence mark information generation means.

The first information processing apparatus may further comprise essence mark input acceptance means (for example, an input unit shown in FIG. 8) for accepting inputting of the essence mark, wherein the essence mark information generation means may generate information representing the essence mark accepted by the essence mark input acceptance means.

The first information processing apparatus may further comprise recording means (for example, a clip recording unit shown in FIG. 8 or an edit list writing unit shown in FIG. 13) for recording information on a storage medium (for example, an optical disk shown in FIG. 7), wherein the recording means may record, on the storage medium, content data whose associated information has been registered in the edit list by the content data information registration means.

The recording means may further record, on the storage medium, the edit list (for example, a current edit list shown in FIG. 13) in which information associated with the content data is registered.

The first information processing apparatus may further comprise image capture means (for example, an image pickup unit shown in FIG. 8) for capturing an image of a subject, wherein the content data information generation means may generate information associated with content data obtained via the image capturing performed by the image capture means.

The first information processing apparatus may further comprise data input acceptance means (for example, a clip data input unit shown in FIG. 19) for accepting inputting of the content data from the outside, wherein the content data information generation means may generate information associated with the content data accepted by the data input acceptance means.

The present invention provides a first information processing method for a first information processing apparatus (for example, the editing apparatus shown in FIG. 1) to process content data (for example, clip data shown in FIG. 1). The first information processing method comprising the steps of generating content data information associated with content data (for example, in step S3 shown in FIG. 5), and additionally registering information associated with the content data generated in the content data information generation step, in an edit list (for example, the edit list shown in FIG. 2) indicating a result of editing of the content data (for example, in step S4 shown in FIG. 5).

The present invention provides a first program for causing a computer (for example, the editing apparatus shown in FIG. 1) to perform processing associated with content data (for example, the clip data shown in FIG. 1).

Figure 5:
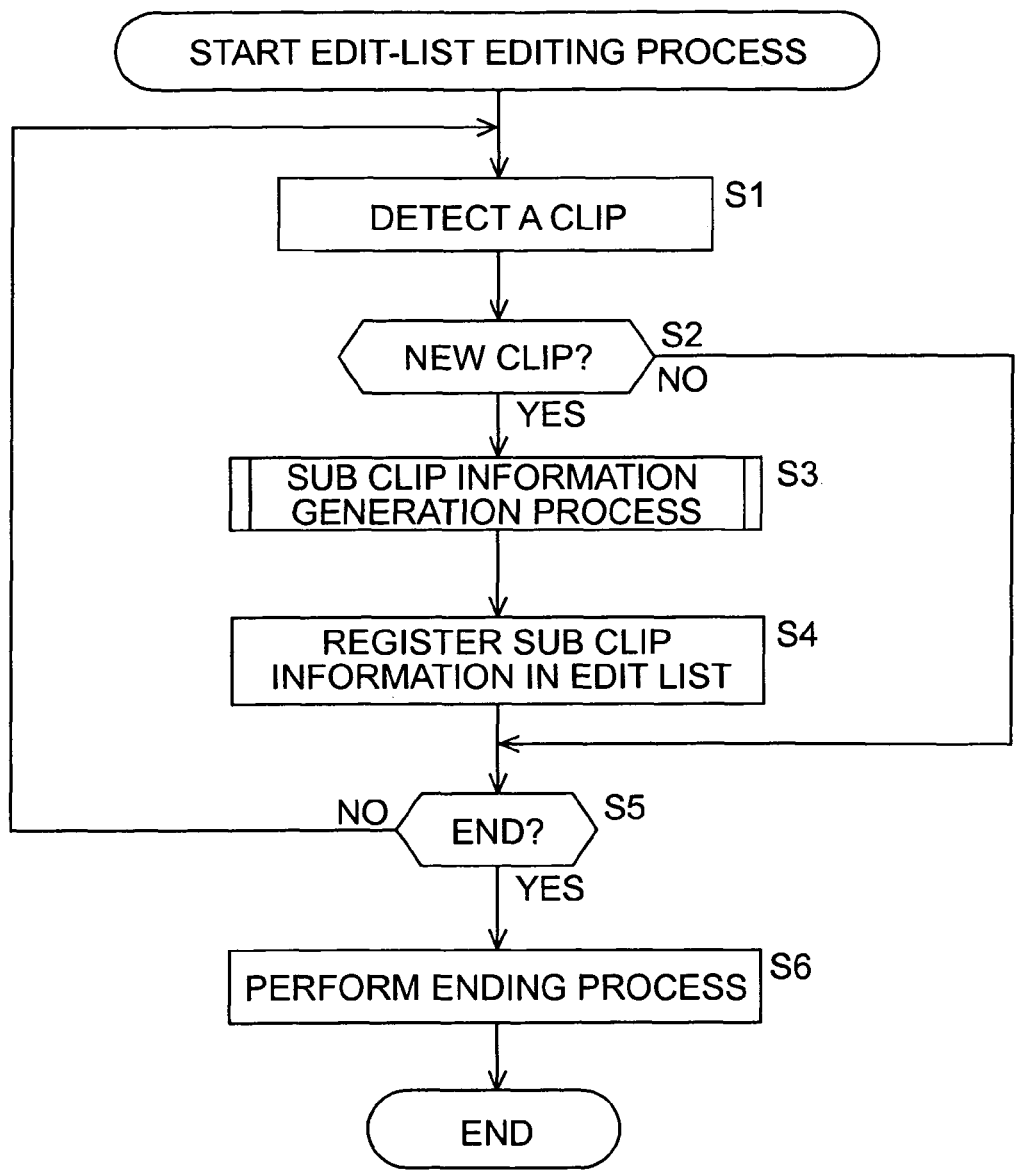
FIG. 5 is a flow chart showing an edit list editing process.

The first program comprising the steps of generating content data information associated with content data (for example, in step S3 shown in FIG. 5), and additionally registering information associated with the content data generated in the content data information generation step, in an edit list (for example, the edit list shown in FIG. 2) indicating a result of editing of the content data (for example, in step S4 shown in FIG. 5).

The present invention provides a second information processing apparatus (for example, an editing apparatus shown in FIG. 7) for processing content data (for example, clip data shown in FIG. 1). The second information processing apparatus comprises grouping list editing means (for example, a grouping list editor shown in FIG. 20) for editing, in accordance with an edit list (for example, the edit list shown in FIG. 2) indicating a result of editing of the content data, a grouping list (for example, a grouping list shown in FIG. 21) indicating groups of the content data included in the result of editing indicated by the edit list.

The second information processing apparatus may further comprise edit list reading means (for example, a reading unit shown in FIG. 20) for reading the edit list recorded on a storage medium (for example, an optical disk shown in FIG. 7), wherein the grouping list editing means may edit the grouping list in accordance with the edit list read by the reading means from the storage medium.

The second information processing apparatus may further comprise edit list designation command accepting means (for example, an input unit shown in FIG. 20 that performs a process in step S161 shown in FIG. 28) for accepting inputting of a command designating an edit list of a plurality of edit lists to be used in editing of the grouping list performed by the grouping list editing means.

The second information processing apparatus may further comprise group designation command accepting means (for example, the input unit shown in FIG. 20 that performs a process in step S162 shown in FIG. 28) for accepting inputting of a command designating a group in which to register the content data included in the result of editing indicated by the edit list, from a plurality of groups (for example, material groups shown in FIG. 21) included in the grouping list.

Figure 28:
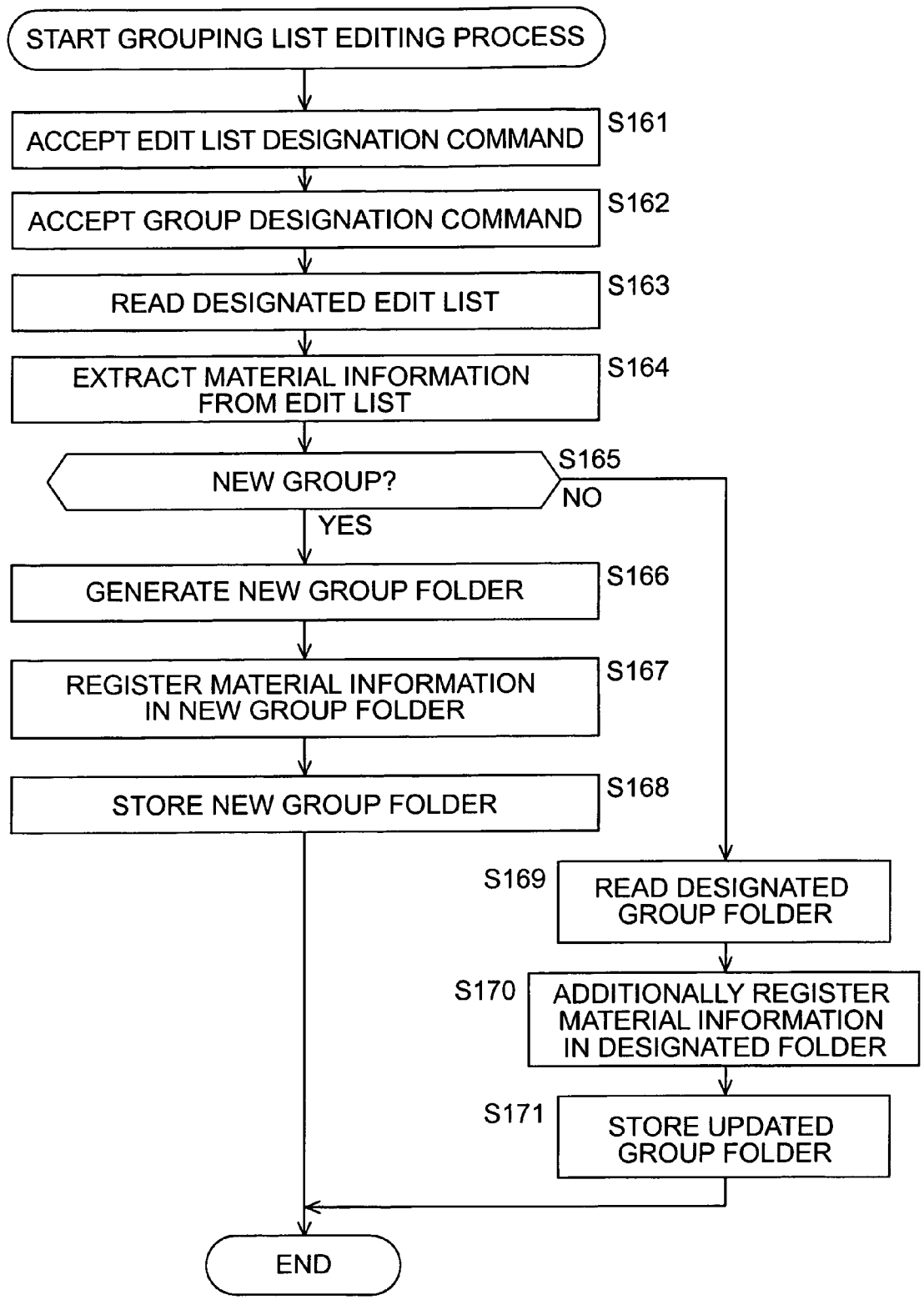
FIG. 28 is a flow chart showing an example of a grouping list editing process.

The grouping list editing means may additionally register the content data in an existing group if the existing group is designated by the command accepted by the group designation command accepting means (for example, in step S170 shown in FIG. 28).

If a new group is designated by the command accepted by the group designation command accepting means, the grouping list editing means may generate the new group (for example, in step S166 in FIG. 28) and register the content data in the new group (for example, in step S167 in FIG. 28).

The second information processing apparatus may further comprise grouping list recording means (for example, a writing unit shown in FIG. 20) for recording the grouping list edited by the grouping list editing means on a storage medium.

The second information processing apparatus may further comprise grouping list outputting means (for example, a data outputting unit shown in FIG. 20) for outputting the grouping list edited by the grouping list editing means to the outside.

The present invention provides a second information processing method for the second information processing apparatus (for example, the editing apparatus shown in FIG. 7) to process content data (for example, clip data shown in FIG. 1). The second information processing method comprising the step of editing, in accordance with an edit list (for example, the edit list shown in FIG. 2) indicating a result of editing of the content data, a grouping list (for example, a grouping list shown in FIG. 21) indicating groups of the content data included in the result of editing indicated by the edit list (for example, in a grouping list editing process shown in FIG. 28).

The present invention provides a second program for causing a computer (for example, an editing apparatus shown in FIG. 7) to perform processing associated with content data (for example, the clip data shown in FIG. 1).

The second program comprising the step of editing, in accordance with an edit list (for example, the edit list shown in FIG. 2) indicating a result of editing of the content data, a grouping list (for example, a grouping list shown in FIG. 21) indicating groups of the content data included in the result of editing indicated by the edit list (for example, in a grouping list editing process shown in FIG. 28).

Embodiments of the present invention are described below with reference to accompanying drawings.

FIG. 1 shows an example of the constitution of an editing apparatus according to an embodiment of the present invention.

The editing apparatus 1 detects clip data including content data such as image data and/or audio data supplied from the outside, outputs the detected clip data, and performs nondestructive editing using the clip data. The editing apparatus 1 includes a clip data detector 11, a sub clip processing unit 12, and an edit list memory 13.

The clip data detector 11 accepts clip data 14 supplied from the outside, detects the clip data 14, extracts meta data associated with the clip data 14, and the supplies the extracted meta data to the sub clip processing unit 12. The clip data detector 11 also outputs the clip data 14 to the outside of the editing apparatus 1.

The sub clip processing unit 12 is a processing unit that registers the clip data 14 detected by the clip data detector 11 in an edit list as a sub clip. The sub clip processing unit 12 includes a sub clip information generator 21 and sub clip information registration unit 22.

The clip is a set of content data such as image data, audio data, and meta data, and the clip data is data of such a clip. The edit list is text information indicating the content of the edition of the clip, and the edit list includes information equivalent to the result of the nondestructive editing of the clip data. A sub clip is a clip (edited clip) included in the edit list. The clip, the sub clip, and the edit list will be described in further detail later.

The sub clip information generator 21 generates sub clip information associated with a sub clip based on information such as meta data supplied from the clip data detector 11 and supplies the generated sub clip information to the sub clip information registration unit 22. The sub clip information generator 21 includes a UMID information generator 31, an edit-list time code generator 32, and an essence mark information generator 33.

The UMID information generator 31 is a processing unit that generates UMID (Unique Material IDentifier) information that is identification information identifying the clip data 14 uniquely and globally. The UMID information generator 31 generates UMID information using UMID included in the information supplied form the clip data detector 11.

The edit-list time code generator 32 generates a value of the edit-list time code assigned to the clip data 14, wherein the edit-list time code is defined over the entire edit list. For example, the edit-list time code generator 32 generates information indicating the edit-list time code value assigned to a start frame of the clip data 14. Based on the edit-list time code assigned to the clip data 14, the clip data 14 is managed in terms of the temporal position in the edit list.

The essence mark information generator 33 generates essence mark information associated with an essence mark added to a sub clip. An essence mark is meta data added to a frame of a sub clip (clip data 14) to indicate the feature of the added frame. An example of an essence mark is an IN point indicating a start point (frame) of an employed part of the entire image of the clip data 14, and another example if an OUT point indicating an end point (frame).

The sub clip information generator 21 generates information using the UMID information generator 31, the edit-list time code generator 32, and the essence mark information generator 33, and supplies the generated information as sub clip information to the sub clip information registration unit 22.

The sub clip information registration unit 22 registers the sub clip information generated by the sub clip information generator 21 in the edit list stored in the edit list memory 13, and the sub clip information registration unit 22 adds the clip data 14 detected by the clip data detector 11 to the edit list.

The edit list memory 13 is realized using a memory device such as an SDRAM (Synchronous Dynamic Random Access Memory) and serves to store the edit list in which the clip data 14 is registered.

The edit list is described in further detail below. As described above, the edit list is text information indicating the result of nondestructive editing of clip data. More specifically, as shown in FIG. 2, the edit list 42 is generated so as to represent the result of the editing of material data (clip data) 41, and complete package data (complete content data) 43 is generated in accordance with the edit list 42.

Figure 2:
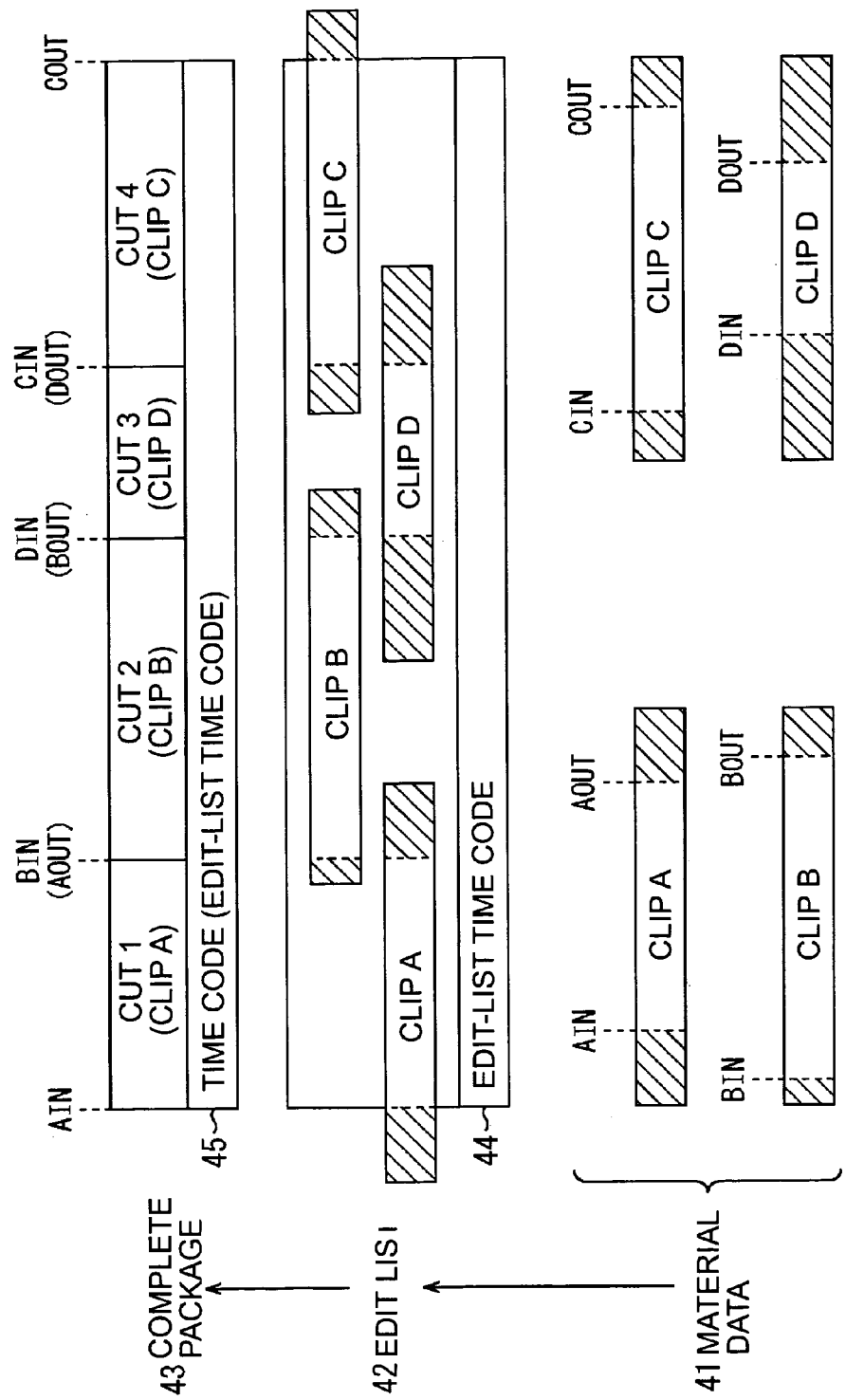
FIG. 2 is a diagram showing an edit list.

That is, as shown in FIG. 2, the edit list 42 is not a simple collection of a plurality of material data 41 but also includes edit information such as IN points and OUT points and time codes defined for use in the edit list.

For example, let us assume that there are four clip data (clip A, clip B, clip C, and clip D) as the material data 41 and the edit list 42 is generated from these four clip data as shown in FIG. 2.

An IN point and an OUT point are defined in each of the clip A, the clip B, the clip C and the clip D. More specifically, AIN and AOUT are defined respectively as the IN point and the OUT point for the clip A. A frame image located between AIN and AOUT is employed as the clip A, and the other parts (diagonally shaded) outside the part enclosed between AIN and AOUT are discarded. Similarly, BIN and BOUT are defined respectively as the IN point and the OUT point for the clip B, CIN and COUT as the IN point and OUT point for the clip C, and DIN and DOUT as the IN point and OUT point for the clip D.

The edit list 42 is information indicating the result of the editing in terms of the locations, represented in the edit-list time code 44, of the material data 41. In the edit list 42, the frames employed as the clips are connected in the order the clip A, the clip B, the clip D, and the clip C. More specifically, the clip B is connected to the clip An at AOUT and BIN, the clip D is connected to the clip B at BOUT and DIN, and the clip C is connected to the clip D at DOUT and CIN, and these clips A to D are placed in a zone from AIN to COUT in the edit-list time code.

The complete package 43 is content data obtained as a result of editing of the material data according to the edit list 42. Thus, the complete package 43 includes a cut 1 to a cut 4 corresponding to the clip A to the clip D. The complete package 43 also includes a time code 45 corresponding to the edit-list time code 44.

As described above, use of the edit list 42 makes it possible to perform not only a simple editing process such as connecting of material data 41 but also a complicated editing process such as placing an arbitrary part of the material data 41 at an arbitrary temporal position indicated by a time code.

The edit list 42 is described in a particular language such as XML (extensible Markup Language). FIG. 3 shows a specific example of the edit list 42.

In FIG. 3, for convenience of explanation, numerals are described at beginnings of respective rows. Note that these numerals are not included in the XML description.

The edit list 42 is a file including nondestructive editing information of clips. The edit list 42 also includes information indicating how to play back the edited data.

As shown in FIG. 3, the edit list 42 described in XML is mainly composed of a header enclosed between head tags (<head> and </head>) and a body enclosed between body tags (<body> and </body>). In the example shown in FIG. 3, the header is described from the 3rd row to the 10th row, and the body is descried from the 11th row to the 24th row.

In the header, information associated with an edit list includes meta data files existing in the same edit list directory. In the body, information associated with the editing result and information indicating the playback method are described. In the example shown in FIG. 3, information described in the body indicates that a first clip (Clip1) and a second clip (Clip2) are combined such that the second clip is connected to the first clip.

That is, in the example shown in FIG. 3, information indicating clips to be successively played back is described in a part enclosed between parallel tags (<par> and </par>) in 12th and 23rd rows. More specifically, sub clip information associated with the first clip is described from the 14th row to the 17th row, and sub clip information associated with the second clip is described from the 19th row to the 22nd row, so that these two clips should be successively played back.

Each sub clip information includes, as described earlier, UMID information, an edit-list time code, and essence mark information. For example, in the sub clip information described from the 14th row to the 17th row includes, UMID information indicating the UMID of the first clip is described in the 15th row as src="urn:smpte:umid: 060A2B340101010501010D1213000000FEDCBA98765-43210FED CBA9876543210". In the 16th row, essence mark information indicating the IN point is described as clipBegin="Smpte-30=00:00:00:00". From the 16th row to the 17th row, essence mark information indicating the OUT point is described as clipEnd="smpte-30=00:10:00:00".

In contrast to the edit list 42, a grouping list simply indicates which group each material data belongs to, as shown in FIG. 4. In FIG. 4, a grouping list 46 indicates that six clips (a clip A to a clip F) of the material data 41 are grouped into two groups (a group A and a group B).

When a complete package 48 is generated using the grouping list 46, an editing process 47 is needed to specify clips employed from the respective groups. More specifically, the complete package 48 is generated so as to include two cuts one of which is composed of a clip A selected from the group A and the other one of which is composed of a clip E selected from the group B.

The grouping list 46 can be regarded as a play list that specifies a playback order. That is, in FIG. 4, when the group A is specified to be played back, clips belonging to the group A are played back in the order the clip A, the clip B, and the clip C.

As described above, the edit list and the grouping list (play list) are different in terms of the purpose and information included therein.

A specific example of a process performed by the editing apparatus 1 shown in FIG. 1 is described below.

The editing apparatus 1 performs an edit list editing process in which supplied clip data is detected and the detected clip data is registered in an edit list. Referring to a flow chart shown in FIG. 5, the edit list editing process is described in further detail.

In the first step S1 in the edit list editing process, the clip data detector 11 shown in FIG. 1 detects supplied clips (clip data). If clips are detected, the clip data detector 11 supplies information associated with the detected clips, such as meta data thereof, to the sub clip information generator 21 of the sub clip processing unit 12. In step S2, the sub clip information generator 21 determines whether a new clip has been supplied from the clip data detector 11. If it is determined that a new clip has been supplied, the process proceeds to step S3 to perform a sub clip information generation process. The details of the sub clip information generation process will be described later with reference to a flow chart shown in FIG. 6.

After completion of step S3, the sub clip information generator 21 supplies the generated sub clip information to the sub clip information registration unit 22. In step S4, the sub clip information registration unit 22 registers the supplied sub clip information in the edit list stored in the edit list memory 13.

After the sub clip information is registered in the edit list, the sub clip processing unit 12 determines whether to end the edit list editing process. If it is determined that the edit list editing process should not be ended, the process returns to step S1 to repeat the process from step S1. On the other hand, if it is determined in step S5 that the edit list editing process should be ended, the sub clip processing unit 12 advances the process to step S6. In step S6, the sub clip processing unit 12 performs an ending process including ending of acquisition of the clip data 14. Thus, the edit list editing process is ended.

Now, referring to the flow chart shown in FIG. 6, the details of the sub clip information generation process in step S3 in FIG. 5 are described below.

If the sub clip information generation process is started, in step S21, the UMID information generator 31 of the sub clip information generator 21 generates UMID information using a UMID of the clip data 14. In the next step S22, the edit-list time code generator 32 generates an edit-list time code for the clip. That is, the edit-list time code generator 32 generates information specifying a point of time at which the clip is placed in the edit list.

Subsequently, in step S23, the essence mark information generator 33 generates essence mark information using an essence mark of the clip data 14. After various kinds of information have been generated in the above-described manner, the sub clip information generator 21 generates sub clip information including the generated information. Thereafter, the process returns to step S3 shown in FIG. 5 to repeat step S3 and the following steps.

As described above, by performing the edit list editing process and the sub clip information generation process, the editing apparatus 1 adds, to the edit list, the information associated with the clip data 14 supplied from the outside. Thus, the editing apparatus can arbitrarily edit a plurality of clip data 14 supplied one after another and can produce an edit list which is management information indicating a result of editing. Use of the edit list allows a user who deals with the clip data 14 to easily manage the clip data 14 which are large in size and have complicated relationships with one another.

Figure 7:
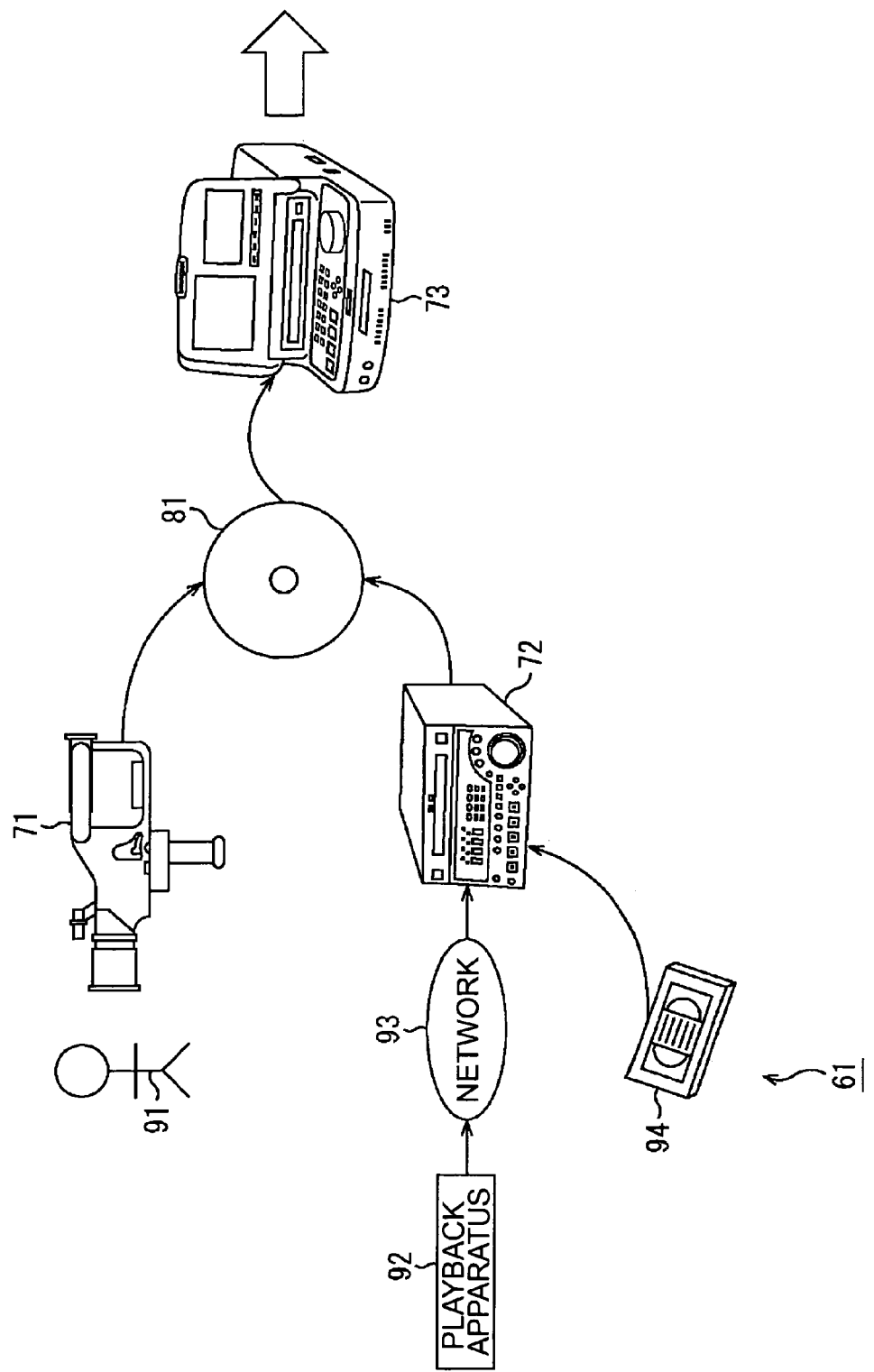
FIG. 7 is a diagram showing a program production support system according to the present invention.

FIG. 7 shows an example of a program production support system according to an embodiment of the present invention.

As shown in FIG. 7, the program production support system 61 includes three types of apparatus, that is, a camcorder 71, a recorder 72, and an editing apparatus 73. The respective apparatus in the program production support system 61 sends/receives data such as content data to/from one another via an optical disk 81 used as a storage medium.

The camcorder 71 is a device capable of taking a picture (sound/voice) and recording it. More specifically, under the control of a user, the camcorder 71 takes a motion picture of a subject 91 with or without an associated sound/voice and records a clip including image data and sound/voice data of the motion picture on the optical disk 81. In this operation, as described in further detail later, the camcorder 71 additionally registers the clip as a sub clip in the edit list.

Unlike the camcorder 71, the recorder 72 does not have the capability of taking a picture (sound/voice) but has a capability of inputting data from the outside. For example, when the recorder 72 receives a clip (image data and/or sound/voice data) supplied from a playback apparatus 92 via a network 93 or the like or a clip read from a storage medium 94, the recorder 72 performs particular signal processing on the received clip and stores (records) the resultant clip on the optical disk 81. In this operation, as described in further detail later, the recorder 72 additionally registers the clip as a sub clip in the edit list.

The editing apparatus 73 edits clips stored on the optical disk 81 in accordance with the edit list stored on the optical disk 81 by the camcorder 71 or the recorder 72, and the editing apparatus 73 outputs, as a complete package, the resultant set of edited material data.

The optical disk 81 is a writable high-capacity storage medium such as DVD-R (Digital Versatile Disc-Recordable), DVD-RW (Digital Versatile Disc-ReWritable), DVD+R (Digital Versatile Disc+Recordable), DVD+RW (Digital Versatile Disc+ReWritable), DVD-RAM (Digital Versatile Disc-Random Access Memory), Blu-rayDisc or professional Disc for DATA (these are all registered trademarks), and is used to store clip data including image data and/or sound/voice data.

Although in the above-described example of the program production support system 61, the optical disk 81 is used as the storage medium, any type of storage medium may be used as long if it has a storage capacity high enough to store clip data.

Figure 8:
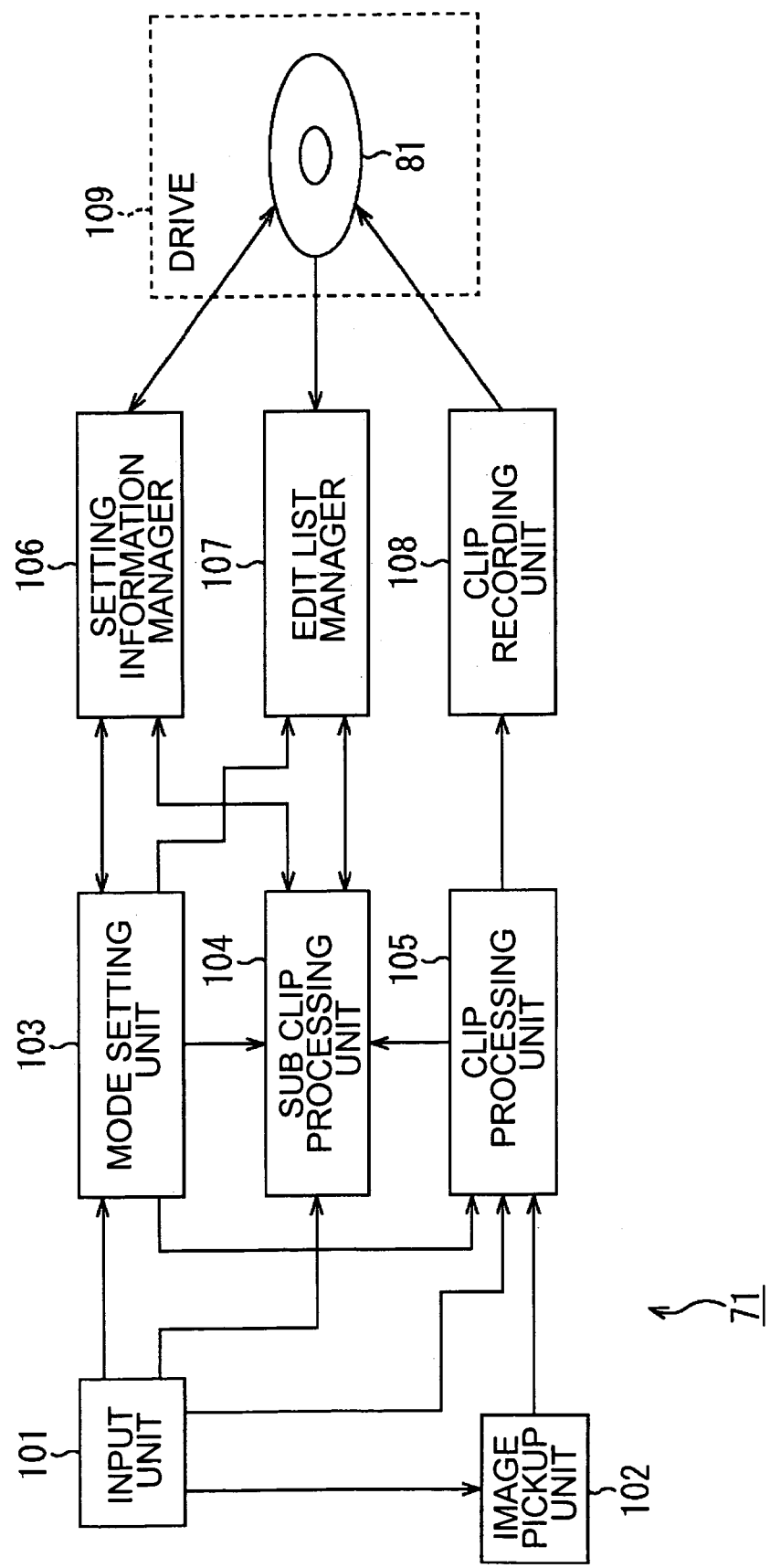
FIG. 8 is a block diagram showing an example of an internal structure of a camcorder shown in FIG. 7.

FIG. 8 is a block diagram showing an example of the internal structure of the camcorder 71 shown in FIG. 7.

As shown in FIG. 8, the camcorder 71 includes an input unit 101, an image pickup unit 102, a mode setting unit 103, a sub clip processing unit 104, a clip processing unit 105, a setting information manager 106, an edit list manager 107, a clip recording unit 108, and a drive 109.

The input unit 101 includes various kinds of buttons and switches and is used by a user to input an operation command or data. The image pickup unit 102 is a processing unit that performs processing associated with taking of a picture, and includes parts forming a camera, such as a photoelectric conversion device using a CCD (Charge Coupled Device) or a CMOS (Complementary Metal Oxide Semiconductor) device, a lens unit, a sound/voice acquisition unit such as a microphone, and a driving unit for driving these parts. In addition to these parts, the image pickup unit 102 also includes a signal processing unit for processing an image signal and/or an audio signal.

The mode setting unit 103 is a processing unit that controls a mode in which the camcorder 71 records an image. As described in further detail later, the camcorder 71 has two image recording modes: a normal mode in which clips are simply recorded; and a sub clip mode in which recorded clips are additionally registered as sub clips in an edit list. The mode setting unit 103 selects a mode in accordance with a command issued by a user and controls various parts such that recording is performed in the selected mode.

The sub clip processing unit 104 generates sub clip information associated with recorded clips and registers the sub clip information in an edit list. The details of the structure of the sub clip processing unit 104 and the process performed thereby will be described later.

The clip processing unit 105 adds meta data to clip data including image data and sound/voice data supplied from the image pickup unit 102 and converts the clip data into a format adapted to recording of the clip data on the optical disk 81. The setting information manager 106 manages setting information associated with the operation of the camcorder 71. The edit list manager 107 manages updating of edit lists stored on the optical disk 81. The details of the structure of the edit list manager 107 and the process performed thereby will be described later. The clip recording unit 108 supplies the clip data received from the clip processing unit 105 to the driver 109 to record the clip data on the optical disk 81 mounted on the drive 109. The drive 109 records the clips supplied from the clip recording unit 108 on the optical disk 81 that is a rewritable storage medium.

Figure 9:
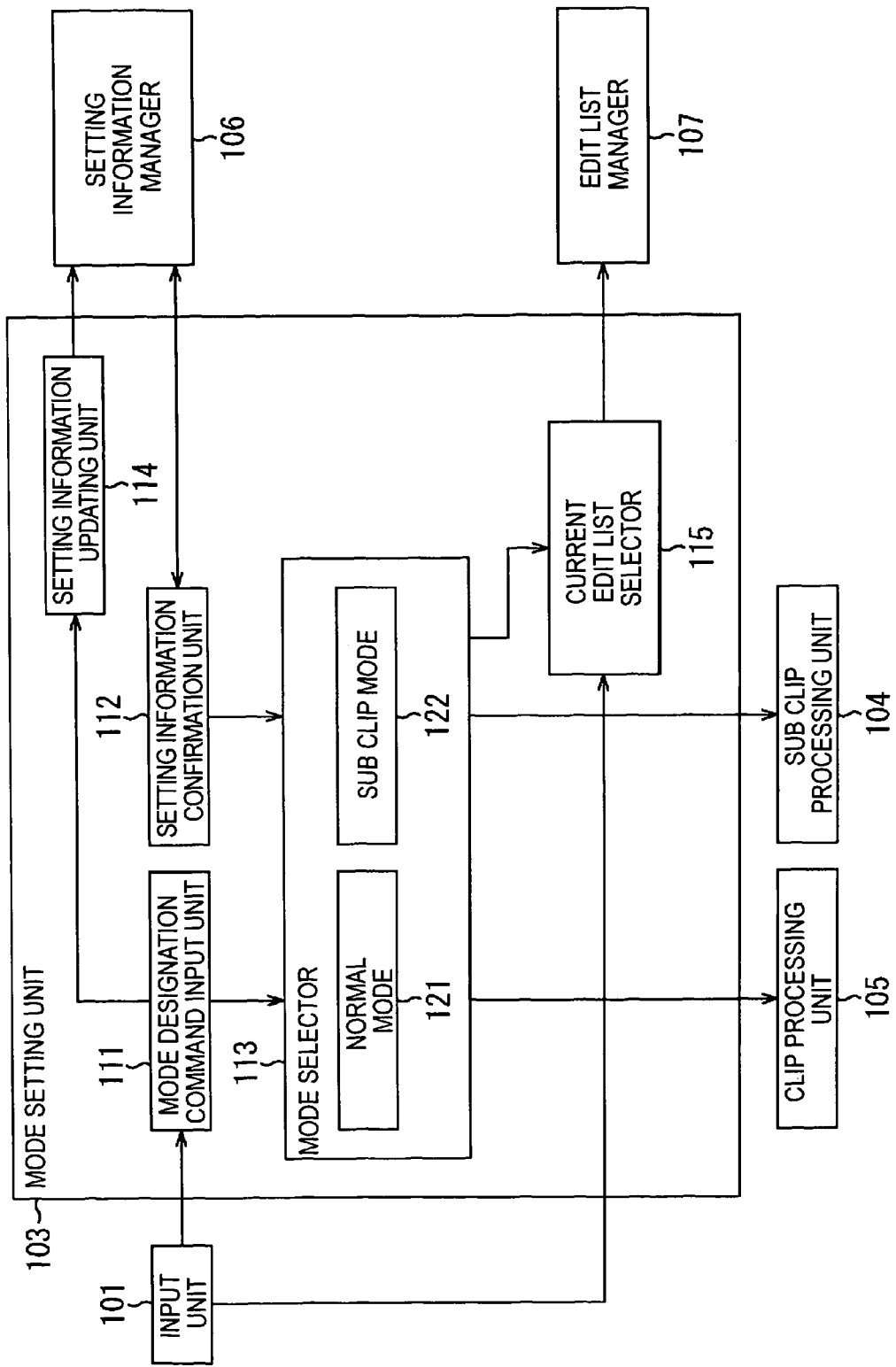
FIG. 9 is a block diagram showing an example of a detailed structure of a mode setting unit shown in FIG. 8.

FIG. 9 is a block diagram showing an example of the structure of the mode setting unit 103 shown in FIG. 8.

As shown in FIG. 9, the mode setting unit 103 includes a mode designation command input unit 111, a setting information confirmation unit 112, a mode selector 113, a setting information updating unit 114, and a current edit list selector 115.

The mode designation command input unit 111 accepts a mode setting command input by a user via the input unit 101, and supplies the input mode setting command to the mode selector 113 and the setting information updating unit 114.

As required, the setting information confirmation unit 112 confirms the content of setting information managed by the setting information manager 106, and supplies a confirmation result to the mode selector 113.

The mode selector 113 selects the operation mode of the camcorder 71 from the normal mode 121 and the sub clip mode 122, based on the mode designation command supplied from the mode designation command input unit 111 or the setting information (preset) supplied from the setting information confirmation unit 112. The mode selector 113 supplies the selection result to the sub clip processing unit 104 and the clip processing unit 105 to set the selected operation mode. In the case in which the sub clip mode 122 is selected, the mode selector 113 further controls the current edit list selector 115 to select a current edit list as an edit list in which to register clips.

The setting information updating unit 114 updates the setting information managed by the setting information manager 106 in accordance with a command issued by a user via the mode designation command input unit 111. For example, if an operation mode switch command is issued by a user via the input unit 101, the command is supplied to the setting information updating unit 114 via the mode designation command input unit 111. In accordance with the received command, the setting information updating unit 114 updates the operation mode information described in the setting information managed by the setting information manager 106.

In the case in which the sub clip mode 122 is selected by the mode selector 113, the current edit list selector 115 selects a current edit list in which to register sub clips in accordance with a command input by a user via the input unit 101, and supplies the input command to the edit list manager 107.

Figure 10:
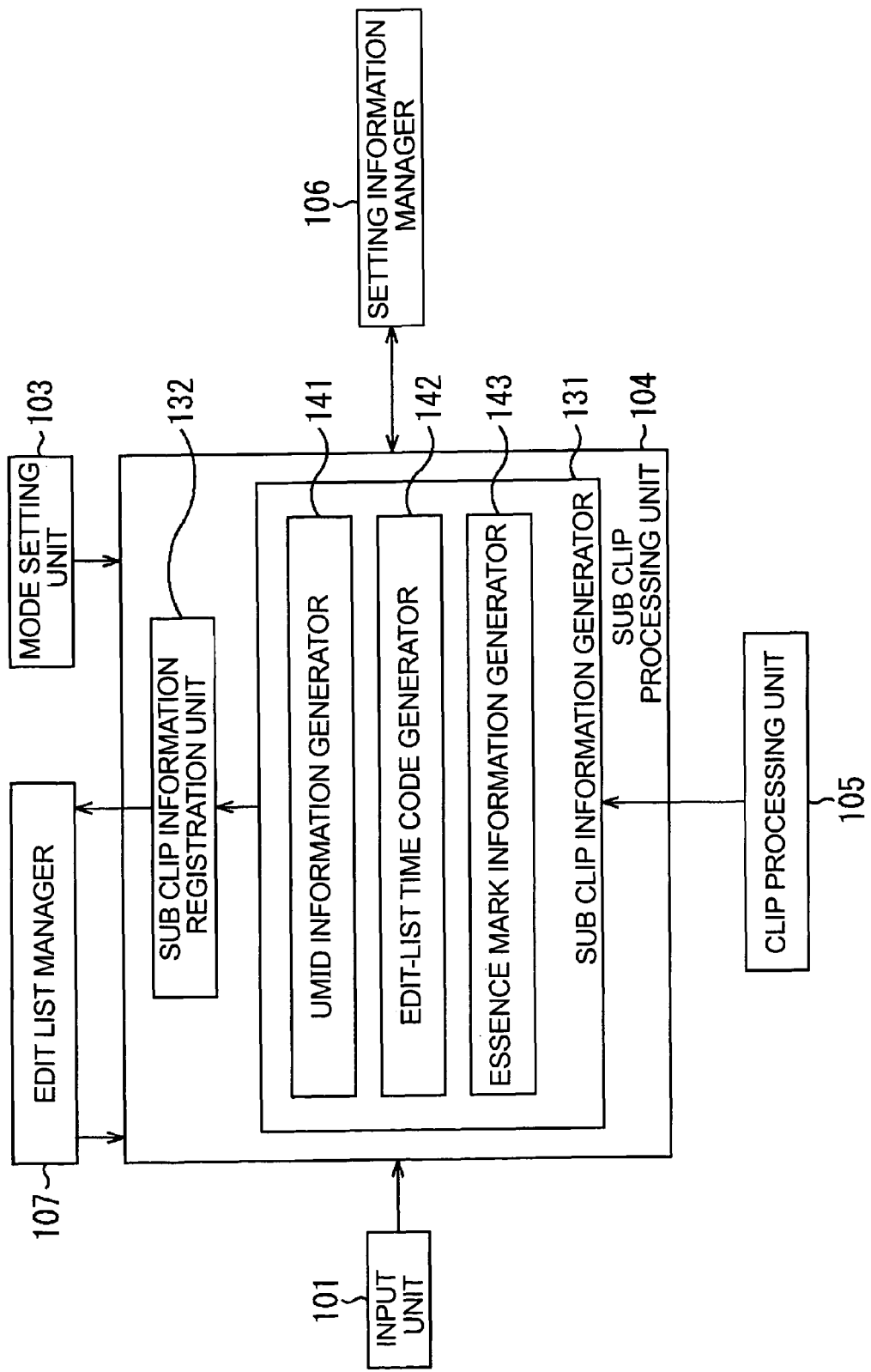
FIG. 10 is a block diagram showing an example of a detailed structure of a sub clip processing unit shown in FIG. 8.

FIG. 10 is a block diagram showing, in detail, an example of the structure of the sub clip processing unit 104.

As shown in FIG. 10, the sub clip processing unit 104 is similar in structure to the sub clip processing unit 12 shown in FIG. 1, and includes a sub clip information generator 131 and a sub clip information registration unit 132. In the case in which the sub clip mode 122 is selected by the mode setting unit 103, the sub clip processing unit 104 additionally registers clips, recorded on the optical disk 81, as sub clips in the edit list in accordance with information supplied from the input unit 101 or the setting information manager 106 and in accordance with information such as meta data supplied from the clip processing unit 105.

The sub clip information generator 131 is similar in structure to the sub clip information generator 21 shown in FIG. 1, and includes a UMID information generator 141, an edit-list time code generator 142, and an essence mark information generator 143. The sub clip information generator 131 generates sub clip information to be registered in the edit list, based on various kinds of information generated by processing units described above, and registers the generated sub clip information in the sub clip information registration unit 132.

The UMID information generator 141 is basically similar in structure to the UMID information generator 31 shown in FIG. 1 and generates UMID information of clips to be processed by the clip processing unit 105 (clips to be recorded on the optical disk 81) based on information such as meta data supplied from the clip processing unit 105 and based on a command issued by a user via the input unit 101.

The edit-list time code generator 142 is similar in structure to the edit-list time code generator 32 shown in FIG. 1, and generates edit-list time codes corresponding to the clips processed by the clip processing unit 105 (clips recorded on the optical disk 81), based on information such as meta data supplied from the clip processing unit 105, a command issued by a user via the input unit 101 and/or setting information supplied from the setting information manager 106.

The essence mark information generator 143 is similar in structure to the essence mark information generator 33 shown in FIG. 1 and generates essence mark information of clips processed by the clip processing unit 105 (clips recorded on the optical disk 81), based on information such as meta data supplied from the clip processing unit 105, a command issued by a user via the input unit 101, and/or setting information supplied from the setting information manager 106.

The sub clip information registration unit 132 is similar in structure to the sub clip information registration unit 22 shown in FIG. 1 and registers sub clip information generated in the above-described manner in the current edit list managed by the edit list manager 107.

Figure 11:
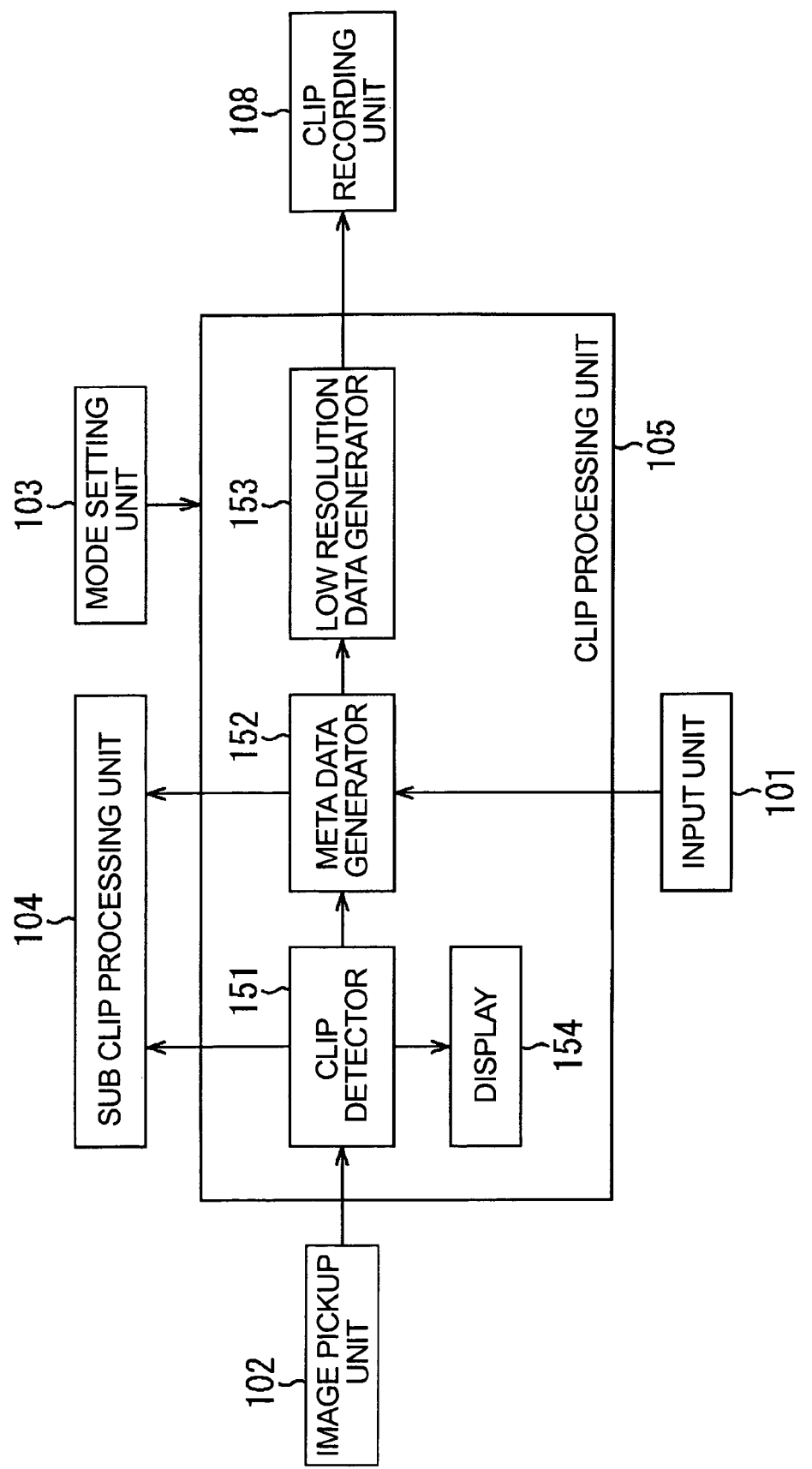
FIG. 11 is a block diagram showing an example of a detailed structure of a clip processing unit shown in FIG. 8.

FIG. 11 is a block diagram showing, in detail, an example of the structure of the clip processing unit 105. The clip processing unit 105 processes the clip data supplied from the image pickup unit 102, in accordance with the mode setting information supplied from the mode setting unit 103. The clip processing unit 105 includes a clip detector 151, a meta data generator 152, a low resolution data generator 153, and a display 154.

The clip detector 151 is a processing unit that detects clip data supplied from the image pickup unit 102. When the clip detector 151 detects clip data, the clip detector 151 supplies the detected clip data to the meta data generator 152 and informs the sub clip processing unit 104 of the detection result. The clip data detected by the clip detector 151 is also supplied to the display 154.

When no meta data is included in the clip data supplied from the clip detector 151 or when the meta data of the clip data is to be updated, the meta data generator 152 generates (updates) meta data associated with the clip data in accordance with the clip data or a command input by a user via the input unit 101. The generated meta data is attached to the clip data and supplied to the low resolution data generator 153. The meta data generated (updated) by the meta data generator 152 is also supplied to the sub clip processing unit 104.

The low resolution data generator 153 generates low resolution data with resolution lower than that of the supplied clip data. The generated low resolution data is attached to the clip data and supplied to the clip recording unit 108.

Figure 12:
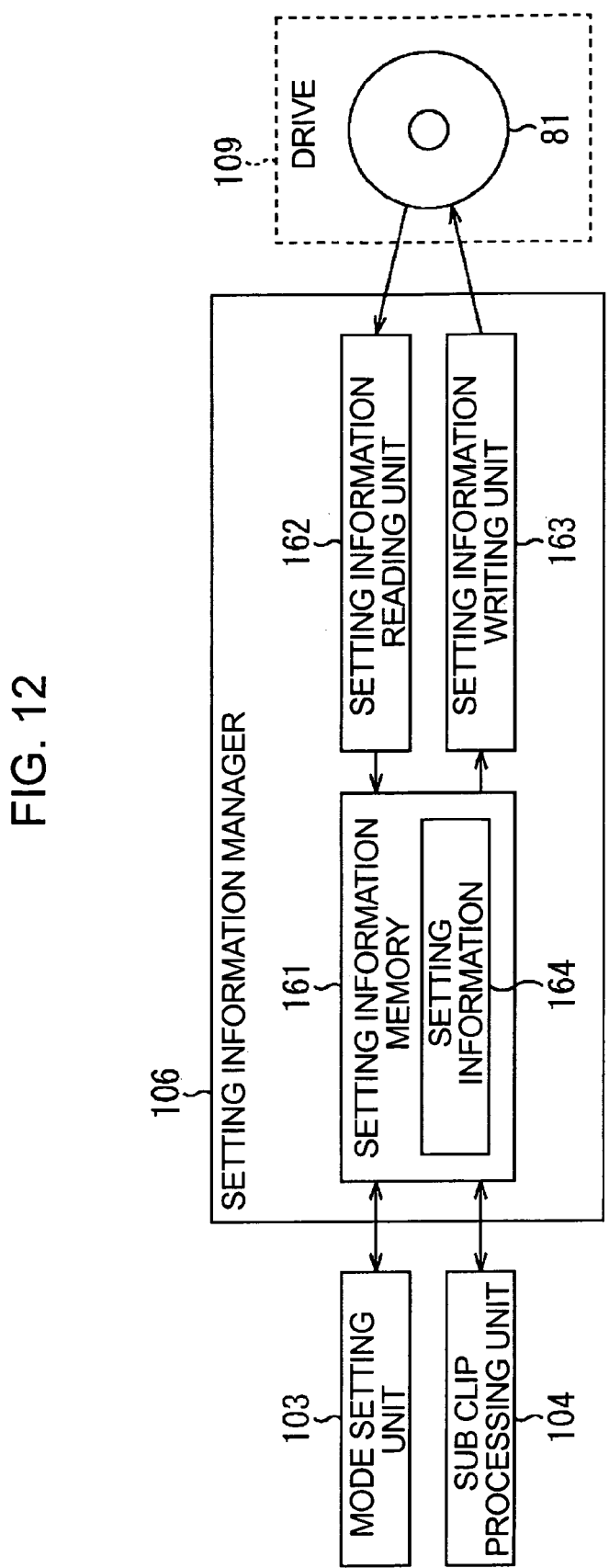
FIG. 12 is a block diagram showing an example of a detailed structure of a setting information manager shown in FIG. 8.

FIG. 12 is a block diagram showing, in detail, an example of the structure of the setting information manager 106 shown in FIG. 8. The setting information manager 106 shown in FIG. 12 is a processing unit that manages setting information, such as information indicating the operation mode, of the camcorder 71. The setting information manager 106 includes a setting information memory 161, a setting information reading unit 162, and a setting information writing unit 163.

The setting information memory 161 acquires setting information 164 read by the setting information reading unit 162 from the optical disk 81 mounted on the drive 109. The setting information 164 stored in the setting information memory 161 is read and updated, as required, by the mode setting unit 103 or the sub clip processing unit 104. If the setting information 164 is updated, the setting information writing unit 163 acquires the updated setting information 164 and writes it on the optical disk 81 mounted on the drive 109.

Figure 13:
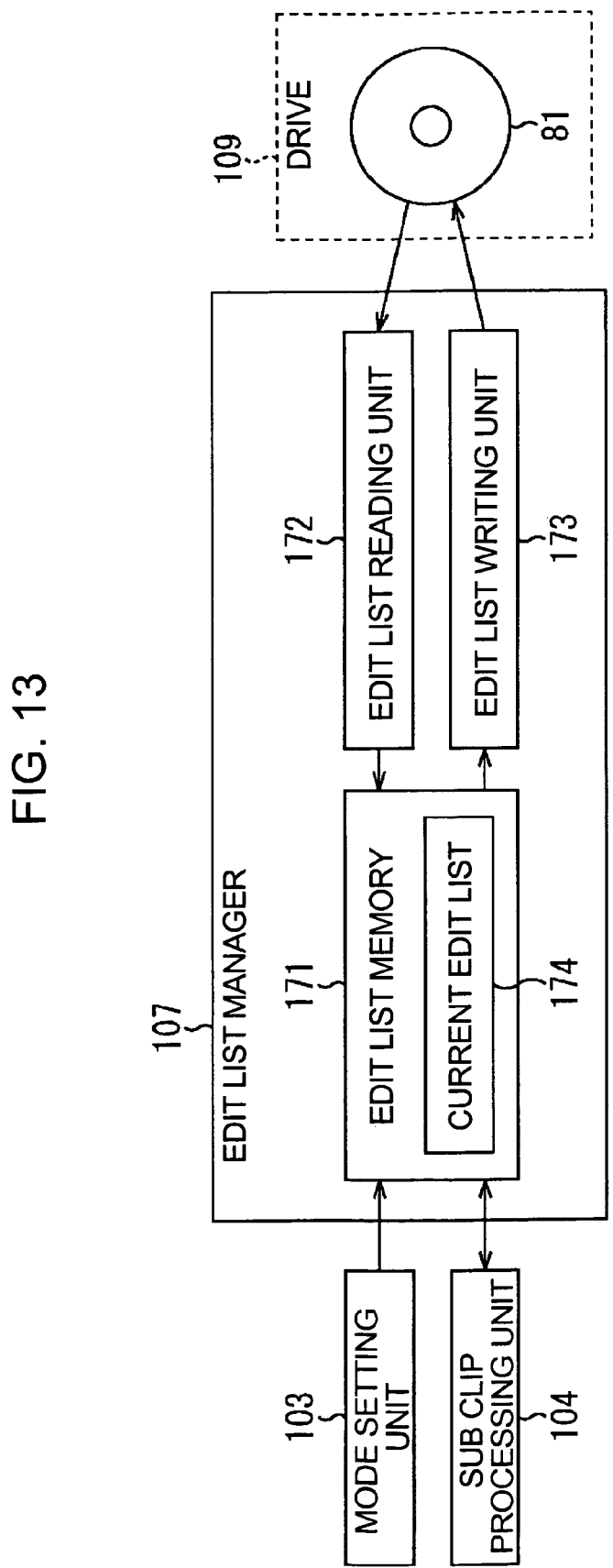
FIG. 13 is a block diagram showing an example of a detailed structure of an edit list manager shown in FIG. 8.

FIG. 13 is a block diagram showing, in detail, an example of the structure of the edit list manager 107 shown in FIG. 8. The edit list manager 107 shown in FIG. 13 is a processing unit that manages edit lists in which clips are registered. The edit list manager 107 includes an edit list memory 171, an edit list reading unit 172, and an edit list writing unit 173.

The edit list memory 171 acquires an edit list read by the edit list reading unit 172 from the optical disk 81 mounted on the drive 109 and stores the acquired edit list as the current edit list 174. The current edit list 171 stored in the edit list memory 171 is read and updated, as required, by the mode setting unit 103 or the sub clip processing unit 104. If the current edit list 174 stored in the edit list memory 171 is updated, the edit list writing unit 173 acquires the updated current edit list 174 and writes it on the optical disk 81 mounted in the drive 109.

Figure 14:
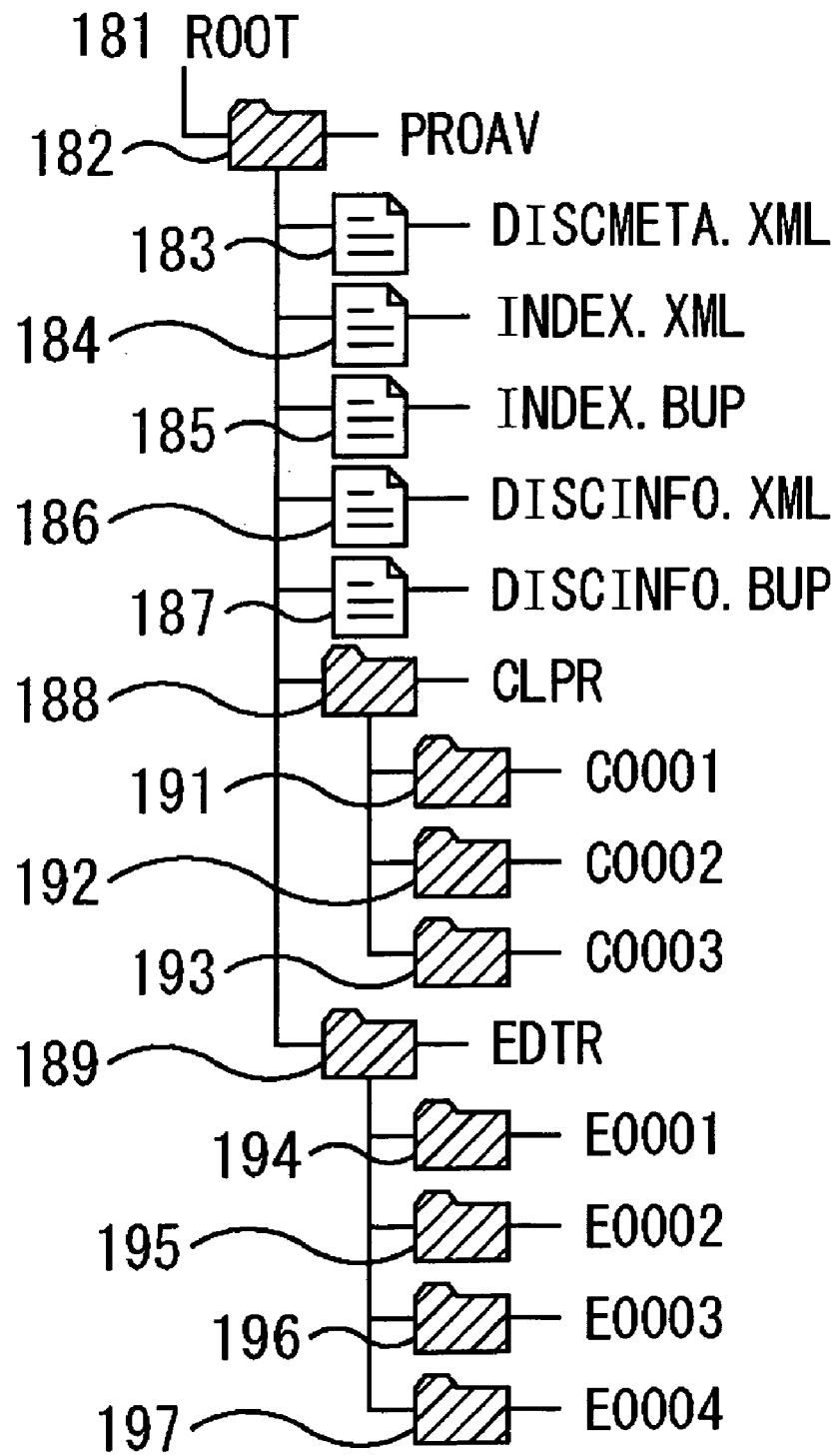
FIG. 14 is a diagram showing an example of a directory structure of an optical disk shown in FIG. 7.
Figure 15:
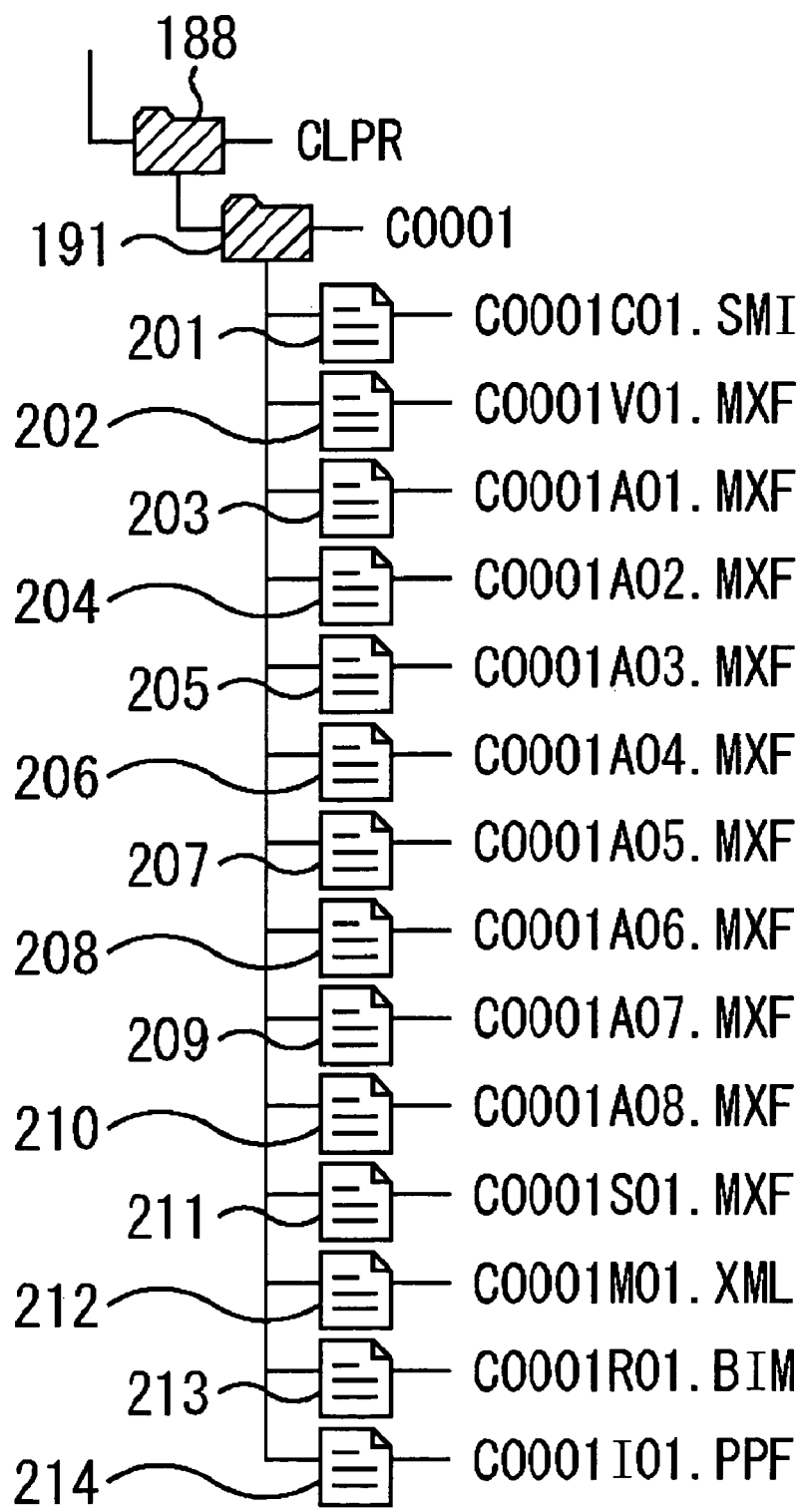
FIG. 15 is a diagram showing an example of a more detailed directory structure of the optical disk shown in FIG. 14.
Figure 16:
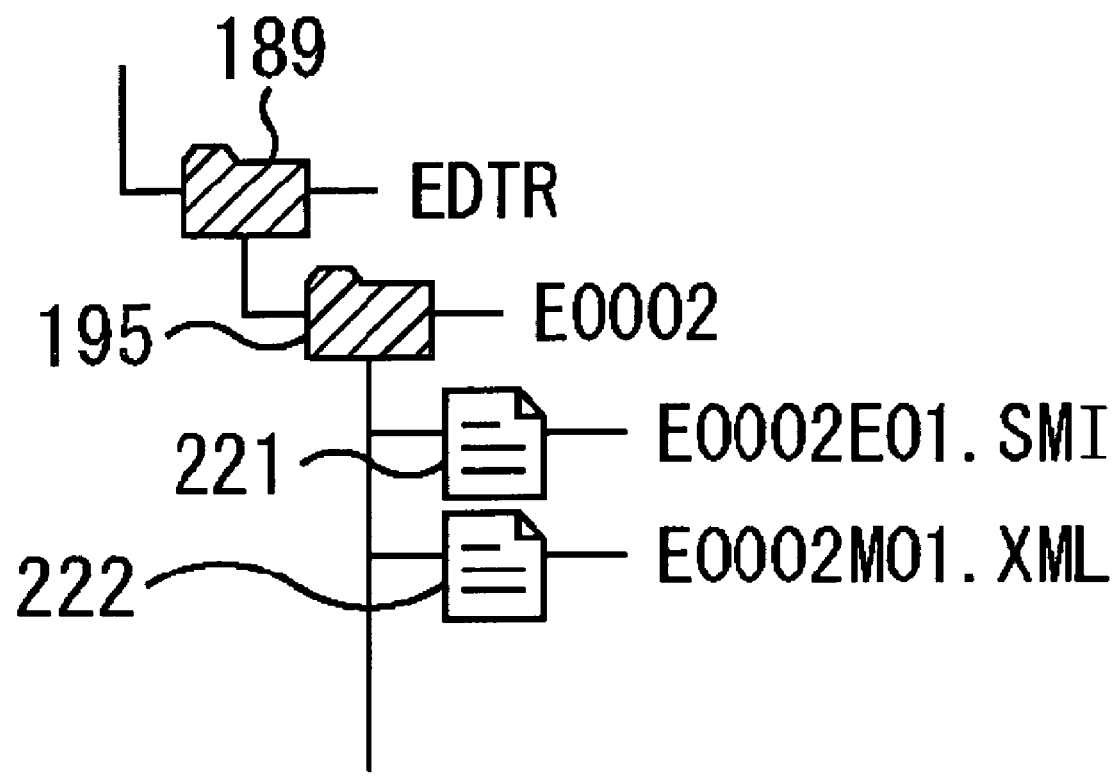
FIG. 16 is a diagram showing an example of a more detailed directory structure of the optical disk shown in FIG. 14.

Information such as that shown in FIGS. 14 to 16 is stored on the optical disk 81.

Data stored on the optical disk 81 is managed by a file system such as the UDF (Universal Disk Format) file system. Note that the file system is not limited to the UDF file system, but other file systems such as the ISO9660 (International Organization for Standardization 9660) file system may be used, as long as they are capable of managing data used by the camcorder 71. For example, when a magnetic disk such as a hard disk is used instead of the optical disk 71, FAT (File Allocation Tables) file system, NTFS (New Technology File System), HFS (Hierarchical File System), or UFS (Unix™ File System) may be used as the file system. A file system designed for dedicated use by the camcorder 71 may also be used.

In FIG. 14, a root directory (ROOT) 181 in a directory PROAV 182. The directory PROAV 182 includes a disk meta file (DISKMETA.XML) 183, an index file (INDEX.XML) 184, and an index file (INDEX.BUP) 185. The disk meta file (DISKMETA.XML) 183 includes information such as a title and/or a comment of each material data (content data such as image data and/or sound/voice data) recorded on the optical disk 81, and also includes information indicating a path of image data of a representative frame of all image data recorded on the optical disk 81. The index file (INDEX.XML) 184 includes management information to manage all clip data and edit lists recorded on the optical disk 81. The index file 185 is a copy of the index file 184. Storing the management information in two files allows an improvement in reliability.

The directory PROAV 182 also includes a disk information file (DISCINFO.XML) 186 and a disk information file (DISKINFO.BUP) 187 including meta data, such as playback history data, associated with all data stored on the optical disk 81. The disk information file 187 is a copy of the disk information file 186. That is, in these two files, the same data is stored to achieve an improvement in reliability.

In addition to the files described above, the directory PROAV 182 also includes a clip root directory (CLPR) 188 for disposing clip data in lower-level directories thereof, and an edit list root directory (EDTR) 189 for disposing data of edit lists in lower-level directories thereof.

In the clip root directory 188, the clip data stored on the optical disk 81 is managed such that each clip is assigned a different directory. For example, in the example shown in FIG. 14, three clip data are managed by assigning a clip directory (C0001) 191, a clip directory (C0002) 192, and a clip directory (C0003) 193 to the respective three clip data. More specifically, data of the first clip recorded on the optical disk 81 is managed by storing the data in a file in a lower-level directory of the clip directory 191, data of the second clip recorded on the optical disk 81 is managed by storing the data in a file in a lower-level directory of the clip directory 192, and data of the third clip recorded on the optical disk 81 is managed by storing the data in a file in a lower-level directory of the clip directory 193.

In the edit list root directory 189, the edit lists stored on the optical disk 81 are managed such that each edit list is assigned a different directory. For example, in the example shown in FIG. 14, four edit lists are managed by assigning an edit list directory (E0001) 194, an edit list directory (E0002) 195, an edit list directory (E0003) 196, and an edit list directory (E0004) 197, to the respective four directories. More specifically, an edit list indicating a first edit result of clips recorded on the optical disk 81 is managed by storing the edit list in a file in a lower-level directory of the edit list directory 194, an edit list indicating a second edit result is managed by storing the edit list in a file in a lower-level directory of the edit list directory 195, an edit list indicating a third edit result is managed by storing the edit list in a file in a lower-level directory of the edit list directory 196, and an edit list indicating a fourth edit result is managed by storing the edit list in a file in a lower-level directory of the edit list directory 197.

In the clip directory 191 located in the clip root directory 188, data of the first clip recorded on the optical disk 81 are managed by storing the data in files in lower-level directories of the clip directory 191 as shown in FIG. 15.

In the example shown in FIG. 15, the clip directory 191 includes a clip information file (C0001C01.SMI) 201 for managing the clip stored in this clip directory 191, an image data file (C0001V01.MXF) 202 in which the image data of this clip is stored, eight audio data files (C0001A01.MXF to C0001A08.MXF) 203 to 210 in which audio data of respective channels are stored, a low-resolution data file (C0001S01.MXF) 211 in which sub stream data (low-resolution data) of the clip is stored, a clip meta data file (C0001M01.XML) 212 in which clip meta data that does not need to be processed in real time, that is, non-real time meta data corresponding to material data of the clip is stored, a frame meta data file (C0001RO1.BIM) 213 in which frame meta data that needs to be processed in real time, that is, real time meta data corresponding to material data of the clip is stored, and a picture pointer file (C0001I01.PPF) 214 in which information associated with a frame structure (for example, a format such as the MPEG format in which each picture is compressed, offset addresses with respect to the beginning of the file, etc.) of the image data file 222 is described.

The low-resolution data file 211 includes low-resolution versions of the image data file 202 and the audio data file 203 to 210. Note that the low-resolution versions are the same in terms of the contents as the original files. For example, when a normal version of the image data of the image data file 202 is compressed in the MPEG2 (Moving Picture Experts Group phase 2) format, the low-resolution version of this image data stored in the low-resolution data file 211 may be compressed in the MPEG4 (Moving Picture Experts Group phase 4) format at a bit rate lower than that of the normal version. When the normal version of the image data of the image data file 202 has a VGA (Video Graphics Array) image size (640 dots×480 dots), the low-resolution version of this image data stored in the low-resolution data file 211 may have a CIF (Common Intermediate Format) size (352 dots×288 dots) that is about one-quarter of the image size of the normal version.

The data of the low-resolution data file 211 is used when a normal version of data such as the data of the image data file 202 or the data of the audio data files 203 to 210 is too large in size. For example, in production of a video or TV program, when material data such as image data or audio data is transmitted via a communication network such as the Internet from an apparatus at a location where shooting is performed to an apparatus located in an edit studio, the normal version of data is too large in data size, and thus the data of the low-resolution data file 211 is transmitted. By first supplying the low-resolution data to the editing apparatus via the Internet or the like, and supplying the normal version of data to the editing apparatus via a storage medium at a later time, it becomes possible for the editing apparatus to perform an editing process using the first-supplied low-resolution data and produce an edit list indicating the editing result. Thus, the editing apparatus can perform the editing process before the normal version of data is supplied via the storage medium. After the normal version of data is received, the editing apparatus can generate complete package data from the normal version of data in accordance with the edit list. This makes it possible to quickly perform the editing process.

In the example shown in FIG. 15, the image data, the low-resolution data, and the frame meta data which need to be processed in real time in a playback operation are managed in a single file to minimize an extra reading time.

As for the audio data which also needs to be processed in real time during the playback operation, eight channels of audio data are acquired so as to adapt to a multichannel playback operation such as a 7.1-channel playback operation, and the respective channels are managed by storing them in different files. Although the audio data are stored in eight files in the present embodiment, the number of files is not limited to eight, but the audio data may be stored in seven or less files or nine or more files.

Each of the image data, the low-resolution data, and the frame meta data may be stored in two or more files, as required.

Figure 6:
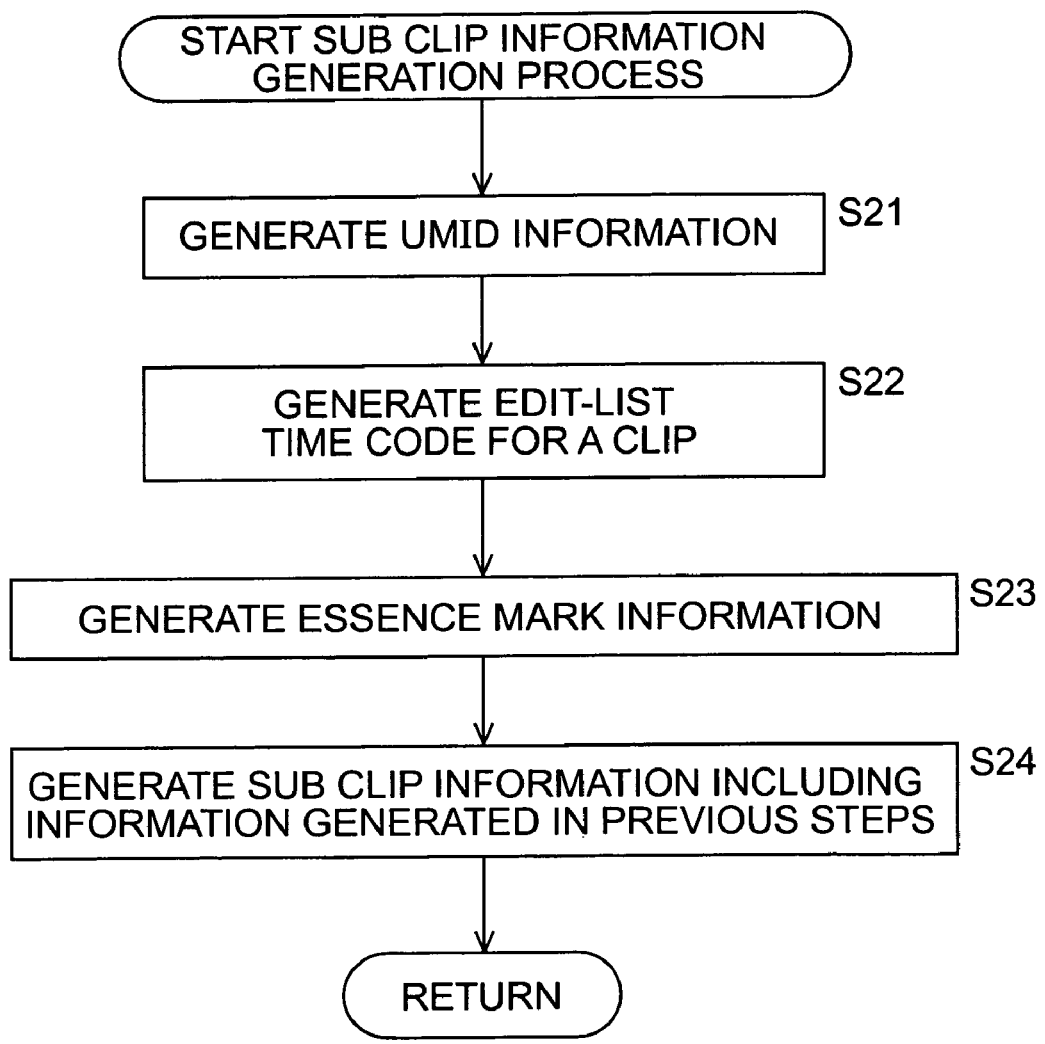
FIG. 6 is a flow chart showing a sub clip information generation process.

In FIG. 6, the clip meta data that does not need to be processed in real time is managed by storing it in a file different from the file of the frame meta data that needs to be processed in real time so that unnecessary meta data is not read during the normal operation of playing back the image data. This makes it possible to reduce the processing time and the processing load needed in the playback operation.

In contrast to the clip meta data file 212 that is described in XML (eXtensible Markup Language) to achieve general versatility, the frame meta data file 213 is described in BIM (BInary format for MPEG-7 data), which is a binary compiled version of the XML format, to minimize the processing time and the processing load during the playback operation.

The example of the file configuration of the clip directory 191 shown in FIG. 15 can be applied to all clip directories corresponding to the respective clips recorded on the optical disk 81. That is, files in the other clip directories such as clip directories 192 and 193 shown in FIG. 14 can be configured in a similar manner as described above with reference to FIG. 15, and thus a further description thereof is omitted.

In the embodiment described above, files associated with one clip are stored in one clip directory. However, the file configuration is not limited to that employed in the above-described embodiment, but files may be configured in an arbitrary manner as long as a clip meta data file associated with each clip is located in a lower-level directory of each clip directory.

An example of a file configuration in which files are located in a lower-level directory of the edit list root directory 189 is described with reference to FIG. 16. In a lower-level directory of the edit list directory 195 of the edit list root directory 189, the edit list data indicating the result of the second editing of clips recorded on the optical disk 81 is stored and managed in the form of files as shown in FIG. 16.

In the example shown in FIG. 16, an edit list file (E0002E01.SMI) 221 and an edit-list clip meta data file (E0002M01.XML) 222 are disposed in the edit list directory 195, wherein the edit list file (E0002E01.SMI) 221 is a file for managing the editing result (the edit list) and the edit-list clip meta data file (E0002M01.XML) 222 is a file including clip meta data corresponding to the material data employed (extracted from material data of all clips) in the editing or new clip meta data generated based on that clip meta data.

The edit-list clip meta data file 222 is a file including new clip meta data generated based on the clip meta data (the clip meta data file located in a lower-level directory of the clip root directory 188) associated with clips used in the editing in accordance with the editing result. For example, in the editing process, a part corresponding to edited essence data is extracted from clip meta data included in the clip meta data file 212 shown in FIG. 15, and new clip meta data is reconstructed for each clip of edited material data and is managed as an edit-list clip meta data file 222. That is, new clip meta data is assigned to each clip of edited essence data of material data, and the resultant clip meta data is managed as one edit-list clip meta data file 222. Thus, the edit-list clip meta data file 222 is produced for each version of edition.

The edit-list clip meta data file 222 is described in XML to achieve high versatility.

The example of the file configuration of the edit list directory 195 shown in FIG. 16 can be applied to any edit list (indicating a result of an editing process). That is, the other edit list directories 194, 196, and 197 shown in FIG. 14 can be configured to a similar manner to the example described above with reference to FIG. 16.

Note that the file configuration of an edit list directory is not limited to the example described above, but an arbitrary file configuration may be employed as long as a clip meta data file associated with an edit list is located in a lower-level directory of an edit list directory.

The setting information 164 is described in further detail below. The setting information 164 is information for managing an operation history such as a playback history of the camcorder 71, and the setting information 164 includes information specifying the operation mode or identification information or frame numbers of data to be processed. The setting information 164 is described in a disk information file 186 and stored on the optical disk 81.

Storing the setting information 164 not in the inside of the camcorder 71, but on the optical disk 81, makes it possible for the camcorder 71 to refer to the stored setting information 164 to recover the camcorder into a state at the point of time at which the setting information 164 was updated even if the electric power of the camcorder 71 is turned off or the optical disk 81 is temporarily removed from the drive 109. The setting information 164 is described in a predetermined language such as XML.

FIG. 17 shows a specific example of the setting information 164 (the disk information file 186). In FIG. 17, for convenience of explanation, numerals are described at left-hand ends of respective rows. Note that these numerals are not included in the XML description.

As described above, the disk information file 186 is a file for managing a playback history of clips recorded on the disk 32 or an edit history of edit lists.

In FIG. 17, the history information is described from a start tag in the second row to an end tag in the eighth row.

For example, "editlist" described in the fourth row in FIG. 17 indicates that the camcorder 71 has been operated in the sub clip mode. "id=E0001" in the same fourth row indicates that an edit list with an edit list number "E0004" read from the optical disk 81 has been stored as the current edit list in the edit list memory 171 of the camcorder 71. Also in this fourth row, "ftc="smpte-30-drop=00:00:00:15"" is described. This indicates that a next sub clip was to be additionally registered in the edit list with the edit list number "E0004" at a position specified by an edit-list time code "00:00:00:15".

In FIG. 17, "tape" described in the fifth row indicates that the camcorder 71 was operated in the normal mode. In the fifth row, also described is id="C0003". This indicates that a clip with a clip number "C0003" was recorded on the optical disk 81 in the normal mode (this clip was the last one at that point of time). ftc="smpte-30-drop=00:02:23:12" also described in this fifth row indicates that the length of the clip with the clip number "C0003" is "00:02:23:12".

In the example described above, three pieces of history information associated with the clips and the edit lists recorded on the optical disk 81 are described in the setting information 164 (the disk information file 186). Note that there is no particular restriction on the number of pieces of history information described in the setting information 164 (the disk information file 186).

History information is described in the order of times of events such that the oldest history information is described in the lowest row and the latest history information is described in the uppermost row. In the example shown in FIG. 17, the history information described in the sixth row is the oldest one, and the history information described in the fourth row is the latest one. When new history information is registered, the oldest history information is deleted.

Although in the example described above, the setting information 164 is stored as the disk information file 186 on the optical disk 81, there is no particular restriction on the name of the file in which the setting information 164 is described. The setting information 164 may be stored together with other information in a single file, or may be stored in a directory different from a directory in which other files are located.

By referring to the setting information 164, the camcorder 71 can operate in the same state (in the same operation mode) as the state (the operation mode) in which the camcorder 71 operated in the past. For example, when the power of the camcorder 71 is turned on, the camcorder 71 can automatically resume the operation in the same state as that in which the camcorder 71 was when the power was turned off, by referring to the setting information 164.

Figure 18:
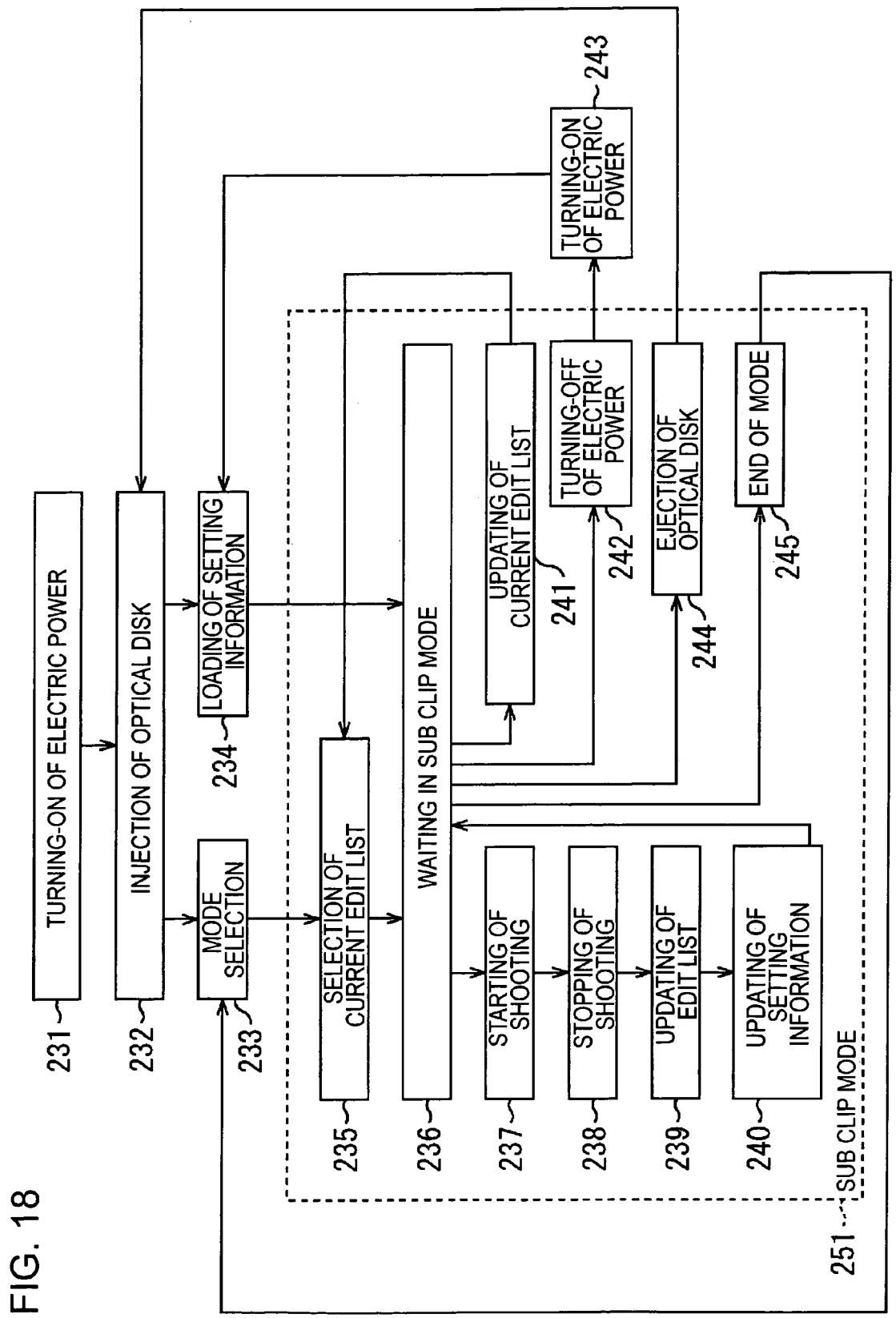
FIG. 18 is a diagram showing a processing flow depending on operation modes.

FIG. 18 shows a processing flow that varies depending on operation modes.

For example, when a user turns on the power of the camcorder 71, the operation state goes to a power-on state 231. In this state, if the user mounts the optical disk 81 on the drive 109, the operation state goes to an optical disk injection state 232. In this state, if there is no setting information 164 on the optical disk 81, the operation state goes to a mode selection state 233 in which an operation mode is selected. For example, if the sub clip mode is selected, the operation state goes to a current edit list selection state 235 in the sub clip mode 251. In this state, if a current edit list 174 is selected, the operation state goes to a sub clip mode waiting state 236 in which the operation waits.

In the optical disk injection state 232, if there is setting information 164 recorded on the optical disk 81, the operation state goes to a setting information loading state 234. If the sub clip mode is specified by the setting information 164, the operation is brought into the sub clip mode 251, and the operation waits in the sub clip mode waiting state 236.

In the sub clip mode waiting state 236, if shooting is started, the operation state goes to a shoot start state 237 and further to a shoot stop state 238. In the sub clip mode, clip data obtained during the shooting operation is registered as sub clip data in the current edit list 174, and thus the operation state goes from the shoot stop state 238 to an edit list updating state 239. When the edit list is updated, the setting information is also updated. Thus, the operation state goes to a setting information updating state 240. When the updating of the setting information is completed, the operation state goes from the setting information updating state 240 to the sub clip mode waiting state 236.

Each time a shooting operation is performed, transitions of the operation state occur in a similar manner. When transitions of the operation state occur, the operation mode is maintained in the sub clip mode 251, and no change in the operation mode occurs.

In the sub clip mode waiting state 236, if a command requesting changing of the current edit list 174 is issued, the operation state goes to a current edit list changing state 241 and further to a current edit list selection state 235. If a current edit list 174 is selected, the operation state goes again to the sub clip mode waiting state 236.

Each time the command requesting changing of the current edit list 174 is issued, the above-described transitions in the operation state occur. When such transitions in the operation state occur, the operation mode is also maintained in the sub clip mode 251, and no change in the operation mode occurs.

In the sub clip mode waiting state 236, if a command demanding turning-off of the power is issued, the operation state goes to a power turning-off state 242 in which the operation is stopped and the sub clip mode 251 is ended. If the power is turned on again, the operation state goes to the power turning-on state 243. Because there is setting information 164 recorded on the optical disk 81, the operation state goes to the setting information loading state 234 immediately after the power is turned on. Although the operation mode has been exited from the sub clip mode 251, the operation mode is automatically brought into the sub clip mode 251 in which the operation mode was when the power was turned off, in accordance with the setting information 164 loaded. Thereafter, the operation state goes to the sub clip mode waiting state 236, as described above.

As described above, if the power is turned on after the power is turned off in the sub clip mode, the operation is resumed in the same operation mode, that is, in the sub clip mode 251, in accordance with the setting information 164.

In the sub clip mode waiting state 236, if a command demanding ejecting of the optical disk 81 is issued, the operation state goes to an optical disk ejecting state 244, in which the processing associated with the optical disk 81 is stopped and the sub clip mode 251 is ended. In this state, if the optical disk is injected again, the operation state goes to the optical disk injecting state 232. Because there is setting information 164 recorded on the optical disk 81, the operation state goes to the setting information loading state 234 from the optical disk injecting state 232. Although the operation mode has been exited from the sub clip mode 251, the operation is automatically resumed in the sub clip mode 251 in which the operation mode was when the optical disk was ejected, in accordance with the setting information 164 loaded. Thereafter, the operation state goes to the sub clip mode waiting state 236, as described above.

As described above, in the sub clip mode, if the optical disk is removed from the drive 109 and re-mounted on the drive 109, transitions in the operation state occur in accordance with the setting information 164, and thus the operation is resumed in the sub clip mode 251.

To end the sub clip mode 251, a mode ending process is performed in the sub clip mode waiting state 236 to exit from the sub clip mode 251. More specifically, as shown in FIG. 18, if a mode end command is issued in the sub clip mode waiting state 236, the operation state goes to a mode ending state 245 to end the sub clip mode 251.

If the sub clip mode 251 is ended, the operation state goes to the mode selection state 233 from the mode ending state 245. In this case, because the operation mode is not the sub clip mode 251, if the power is turned off in this state, the setting information 164 does no allow the operation to be automatically resumed in the sub clip mode 251 when the power is again turned on.

As described above, when the power is turned off or when the optical disk 81 is removed, if the power is again turned on or if the optical disk 81 is again mounted, the operation is resumed in the sub clip mode 251 in accordance with the setting information. This allows a user to easily manage a large number of image data having complicated relationships without having to perform setting of the operation mode each time the power is turned on or each timer the optical disk 81 is mounted.

The structure of the camcorder 71 shown in FIG. 7 has been described above. Now, the recorder 72 shown in FIG. 7 is described below.

In the program production support system 61 shown in FIG. 7, the recorder 72 is basically similar in structure to the camcorder 71. That is, the recorder 72 is capable of recording clips on the optical disk 81 and additionally registering clips as sub clips in an edit list. However, the recorder 72 is different from the camcorder 71 in that clips are given from the outside via an input unit.

Figure 19:
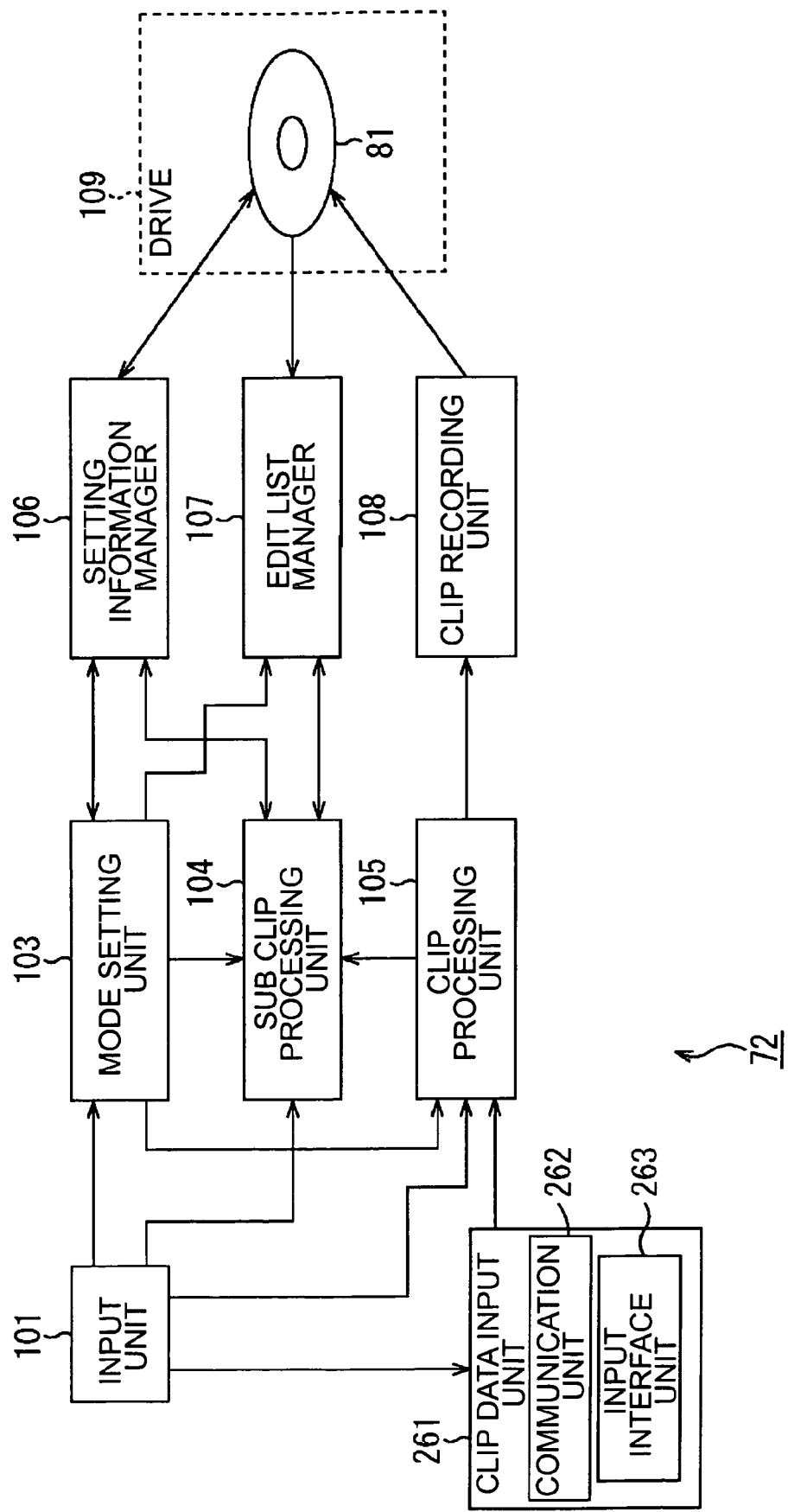
FIG. 19 is a block diagram showing an example of an internal structure of a recorder shown in FIG. 7.

FIG. 19 is a block diagram showing an example of an internal structure of the recorder 72. As shown in FIG. 19, the recorder 72 is similar in structure to the camcorder 71 shown in FIG. 8 except that it has a clip data input unit 261 instead of the image pickup unit 102. In FIG. 19, similar parts to those of the camcorder 71 shown in FIG. 8 are denoted by similar reference numerals, and a further description thereof is omitted.

In FIG. 19, a clip data input unit 261 is a processing unit for inputting clip data from the outside of the recorder 72. The clip data input unit 261 includes a communication unit 261 and an input interface unit 263. The clip data input unit 261 performs processing associated with inputting of clip data in accordance with a command issued by a user via an input unit 101. The resultant acquired clip data is supplied to a clip processing unit 105.

The communication unit 262 is a processing unit for communicating with an external device such as the playback apparatus 92 connected to the recorder 72 via the network 93. The input interface unit 263 is an interface for connecting an external device to the recorder 72. For example, a cable for a connection between the network 93 and the recorder 72 or a drive on which a storage medium 94 is mounted is connected to the input interface unit 263. The communication unit 262 communicates with the external device connected to the input inter face unit 263.

Figure 20:
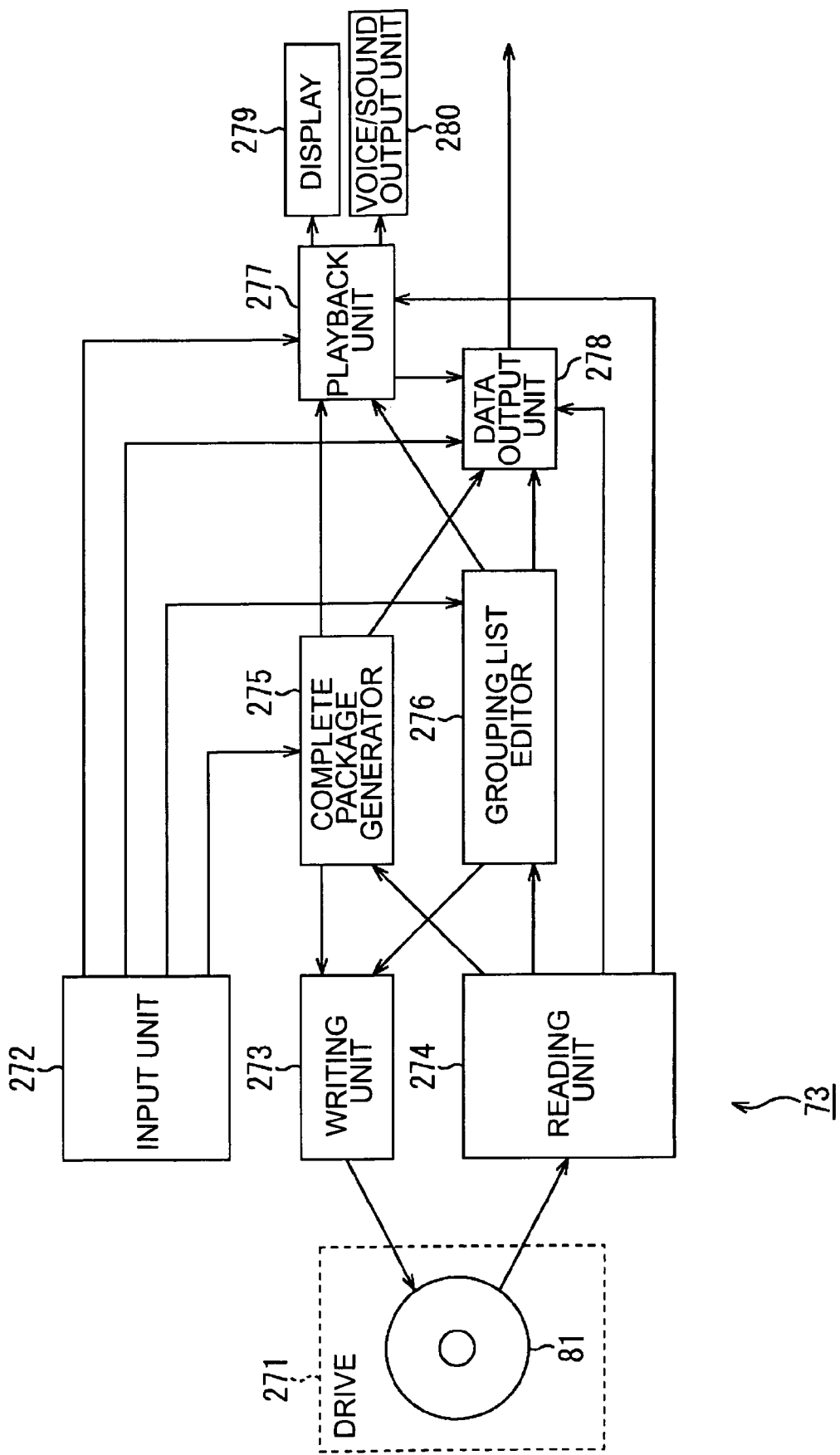
FIG. 20 is a block diagram showing an example of an internal structure of an editing apparatus shown in FIG. 7.

Next, the editing apparatus 73 shown in FIG. 7 is described. The editing apparatus 73 generates a complete package using clips recorded on the optical disk 81 in accordance with an edit list also recorded on the optical disk 81, and outputs the generated complete package. The editing apparatus 73 also generates a grouping list indicating groups of clips from the edit list and output the resultant grouping list. FIG. 20 is a block diagram showing an example of an internal structure of the editing apparatus 73.

As shown in FIG. 20, the editing apparatus 73 includes a drive 271, an input unit 272, a writing unit 273, a reading unit 274, a complete package generator 275, a grouping list editor 276, a playback unit 277, a data outputting unit 278, a display 279, and an audio outputting unit 280.

The drive 271 is a drive device for mounting the optical disk 81 thereon, and the drive 271 writes information supplied from the writing unit 273 on the optical disk 81. The drive 271 is also reads information from the optical disk 81 and supplies the read information to the reading unit 274.

The input unit 272 includes various kinds of switches and buttons. The input unit 272 serves to accept a command issued by a user and supply the accepted command to various parts as required, such as the complete package generator 275, the grouping list editor 276, the playback unit 277, and the data outputting unit 278. The writing unit 273 supplies information received from the complete package generator 275 or the grouping list editor 276 to the drive 271. Under the control of the writing unit 273, the drive 271 writes the supplied information on the optical disk 81. The reading unit 274 reads information from the optical disk 81 via the drive 271 and supplies the read information to various parts, as required, such as the grouping list editor 276, the playback unit 277, or the data outputting unit 278.

If the complete package generator 275 acquires an edit list from the reading unit 274, the complete package generator 275 generates complete package data in accordance with the acquired edit list. The complete package generator 275 supplies the generated complete package data to the playback unit 277 or the data outputting unit 278. The complete package generator 275 may supply the generated complete package data to the writing unit 273 to write it on the optical disk 81.

If the grouping list editor 276 acquires an edit list via the reading unit 274, the grouping list editor 276 generates or edits a grouping list in accordance with the acquired edit list and supplies the resultant grouping list to the playback unit 277 or the data outputting unit 278. The grouping list editor 276 may supply the grouping list to the writing unit 273 to record it on the optical disk 81.

The playback unit 277 plays back the complete package data supplied from the complete package generator 275 by displaying an image thereof on a screen of the display 279 and outputting an associated sound/voice from a speaker of the audio outputting unit 280. The playback unit 277 also acquires clips from the reading unit 274 in accordance with the grouping list supplied from the grouping list editor 276 and plays back the clips by displaying an image thereof on a screen of the display 279 and outputting an associated sound/voice from a speaker of the audio outputting unit 280. The playback unit 277 may supply the playback data to the data outputting unit 278 to output it to the outside of the editing apparatus 73.

The data outputting unit 278 outputs, to the outside of the editing apparatus 73, the complete package data supplied from the complete package generator 275, the clip data acquired from the reading unit 274 in accordance with the grouping list supplied from the grouping list editor 276, or the playback data supplied from the playback unit 277.

Figure 21:
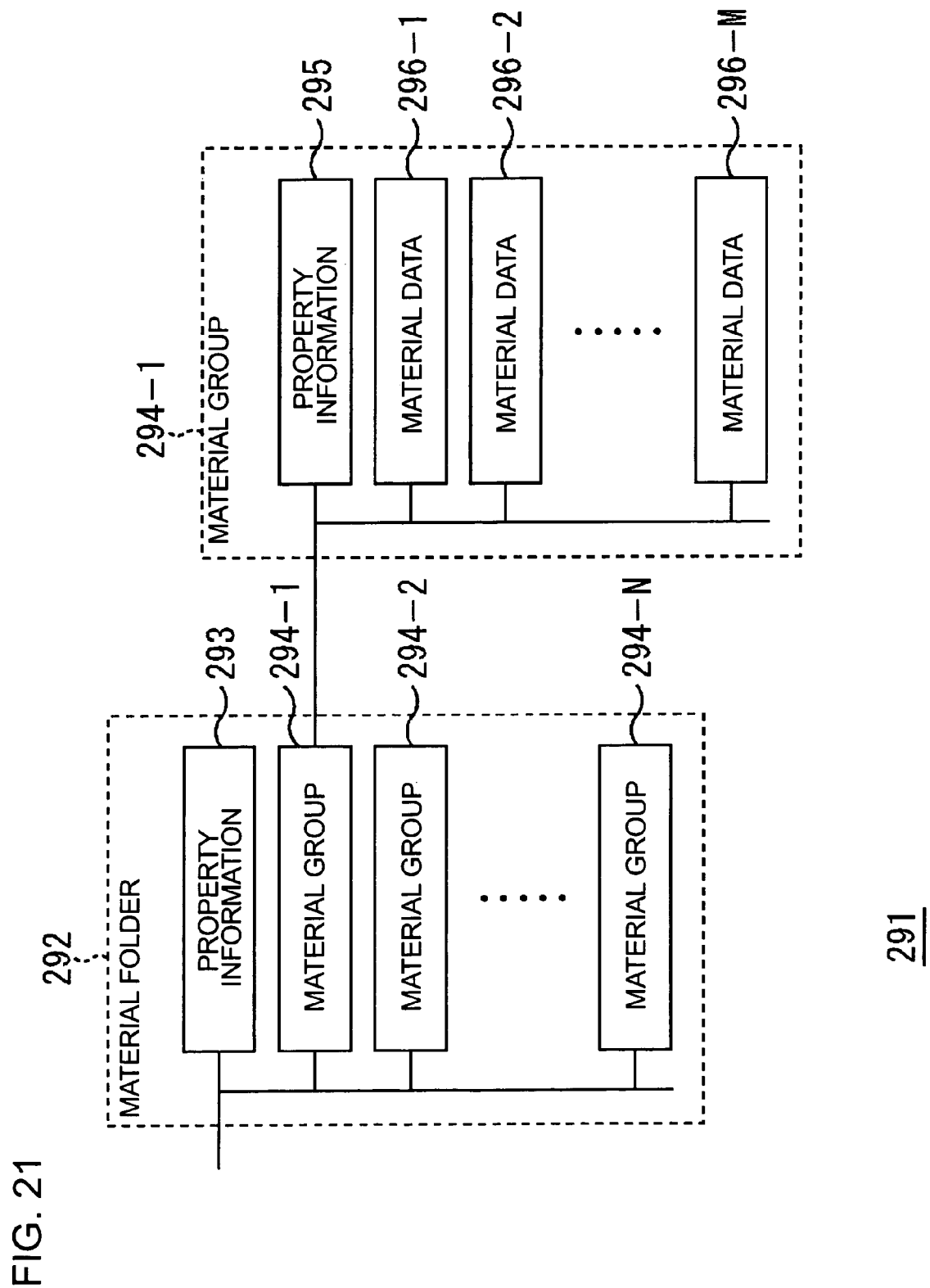
FIG. 21 is a diagram showing an example of a directory structure of a grouping list.

The grouping list edited by the editing apparatus 73 is described in further detail below. FIG. 21 shows a specific example of the structure of the grouping list. As shown in FIG. 21, the grouping list 291 described in a hierarchical form in a material folder 292.

In the material folder 292, one piece of property information 293 and one or more material groups 294 are described. In the example shown in FIG. 21, one piece of property information 293 and material groups 294 including material groups 294-1 to 294-N are described in the material folder 292.

The property information 293 is a file in which various kinds of property information associated with the entire material folder 292 is described. Each material group 294 includes one piece of property information 295 and one or more material data 296. In the example shown in FIG. 21, the material group 294-1 includes one piece of property information 295 and M material data 296 including material data 296-1 to 296-M.

The property information 295 includes various kinds of property information associated with a related material group 294. The material data 296 are material data such as image data and audio data subjected to grouping.

That is, in the grouping list 291, material data are grouped by placing them in the material folder 292 such that material data in the same group are located in a lower-level of the same material group 294.

Processes performed by the respective apparatus in the program production support system 61 are described below.

First, processes performed by the camcorder 71 are described. Of these processes, a process of setting the operation mode of the camcorder 71 is first described with reference to a flow chart shown in FIG. 22.

In the first step S41 of the setting process, the setting information manager 106 retrieves setting information 164 from the optical disk 81 mounted in the drive 109. In step S42, the setting information manager 106 determines whether there is setting information 164. If setting information 164 is detected, the process proceeds to step S43. In step S43, the setting information manager 106 loads the setting information. The details of the process of loading the setting information will be described later with reference to a flow chart shown in FIG. 23.

Figure 22:
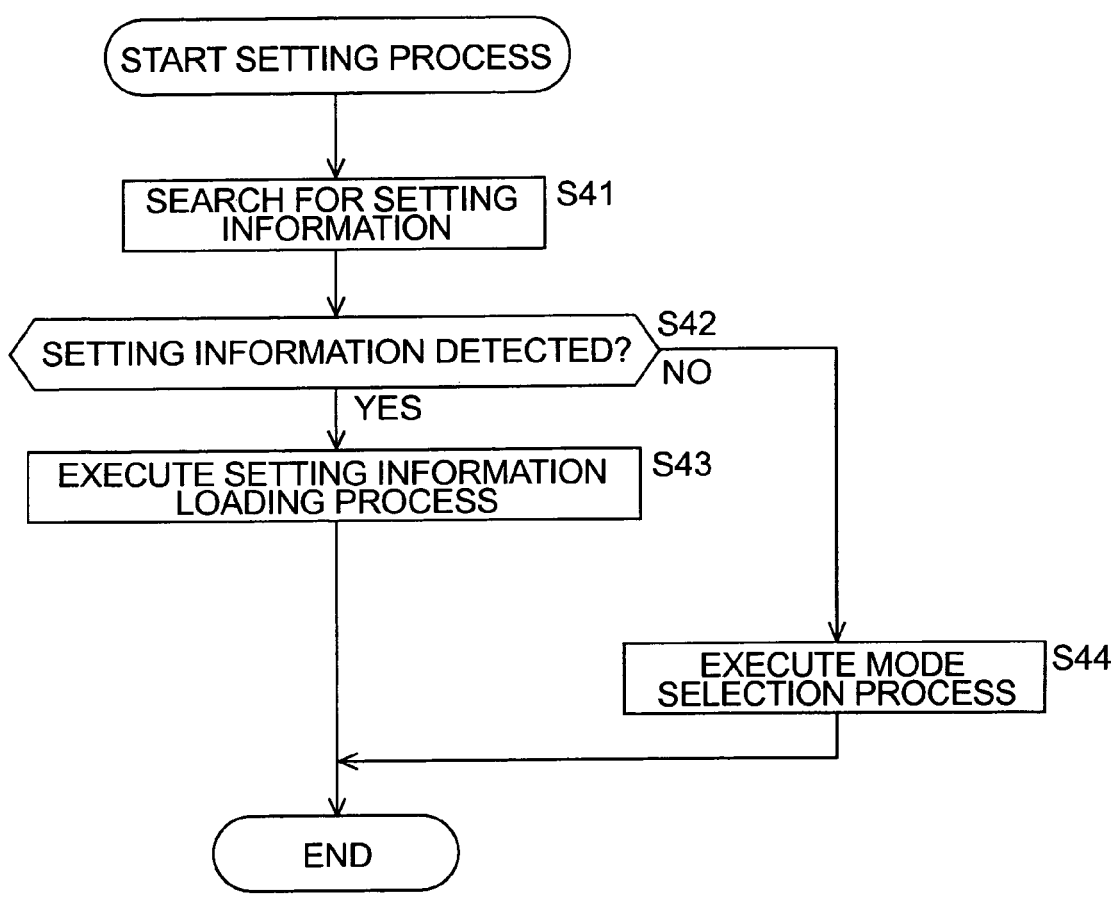
FIG. 22 is a flow chart showing an example of a setting process.

If the process of loading the setting information in step S43 shown in FIG. 22 is completed, the setting information manager 106 ends the setting process. On the other hand, if it is determined in step S42 that there is no setting information, the process proceeds to step S44. In step S44, the setting information manager 106 performs a mode selection process. The details of the mode selection process will be described later with reference to a flow chart shown in FIG. 24. If the mode selection process in step S44 shown in FIG. 22 is completed, the setting information manager 106 ends the setting process.

By performing the process described above, the camcorder 71 sets the operation mode in accordance with the setting information 164 recorded on the optical disk 81. In the case in which no setting information is recorded on the optical disk 81, the operation mode of the camcorder 71 may be selectively determined by a user.

The operation of loading the setting information in step S43 shown in FIG. 22 is described in further detail below.

Figure 23:
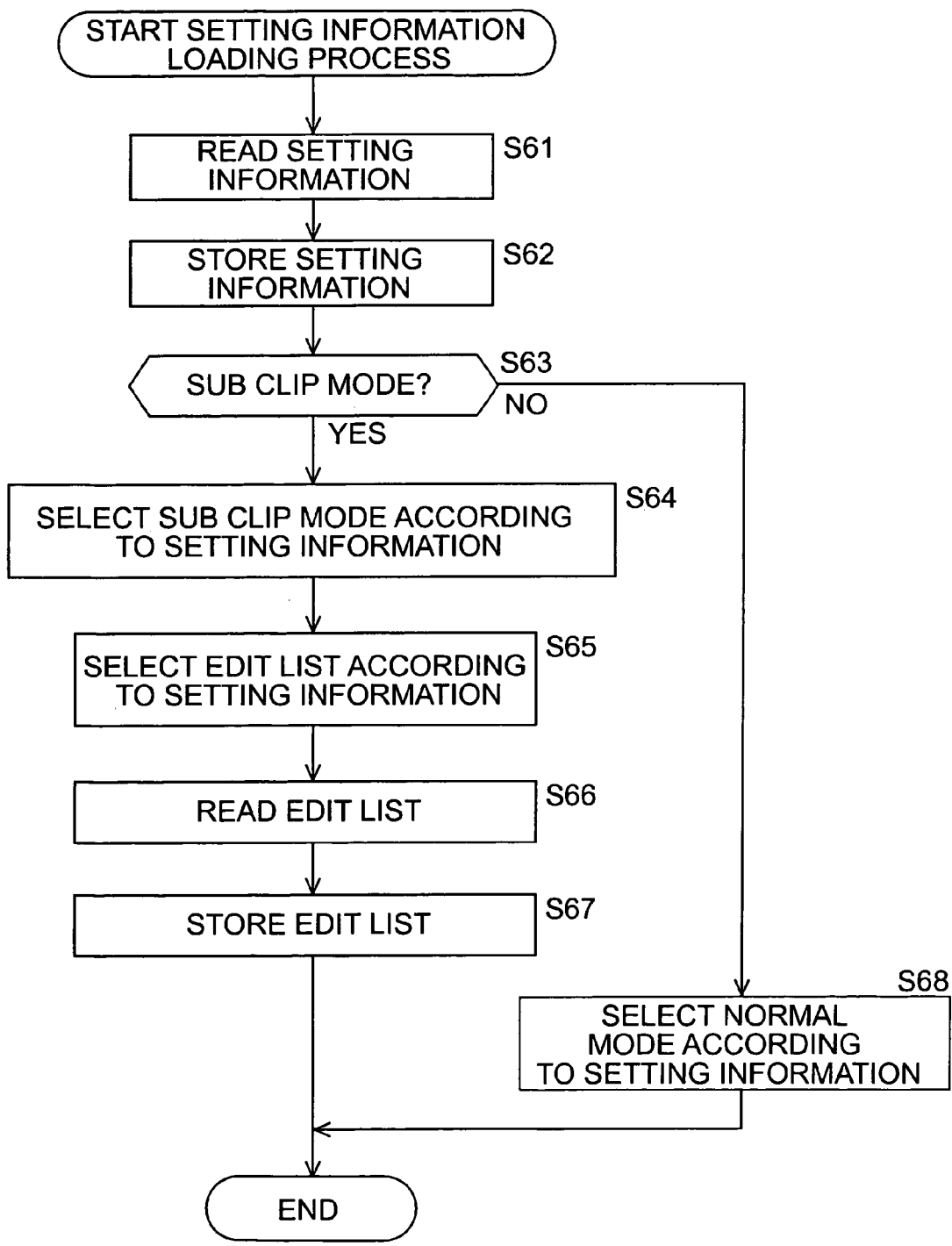
FIG. 23 is a flow chart showing an example of a setting information loading process.

In step S61 shown in FIG. 23, the setting information reading unit 162 of the setting information manager 106 reads the setting information 164 from the optical disk 81 mounted on the drive 109 and supplies the read setting information 164 to the setting information memory 161. In step S62, if the setting information memory 161 receives the setting information 164, the setting information memory 161 stores the received setting information 164.

In step S63, the setting information confirmation unit 112 of the mode setting unit 103 determines whether the operation mode specified by the setting information 164 stored in the setting information memory 161 is the sub clip mode. If it is determined that the operation mode is the sub clip mode, the process proceeds to step S64. In step S64, the mode selector 113 selects the sub clip mode 122 in accordance with the setting information 164 confirmed by the setting information confirmation unit 112, and the mode selector 113 supplies the information indicating that the operation mode is the sub clip mode 122 to the sub clip processing unit 104, the clip processing unit 105, and the current edit list selector 115. In step S65, the current edit list selector 115 selects an edit list according to the setting information 164 and supplies the selection information to the edit list manager 107.

In step S66, the edit list reading unit 172 shown in FIG. 13 reads the edit list and supplies it to the edit list memory 171. In step S67, the edit list memory 171 stores the supplied edit list as the current edit list 174. Thus, the process of loading the setting information is completed.

On the other hand, in the case in which it is determined in step S63 that the operation mode is not the sub clip mode 122, the mode selector 113 of the mode setting unit 103 selects the normal mode 121 according to the setting information 164 and supplies the selection information to the sub clip processing unit 104 and the clip processing unit 105. Thus, the process of loading the setting information is completed.

As described above, by performing the setting information loading process, the camcorder 71 selects the operation mode or reads the edit list in accordance with the setting information.

Figure 24:
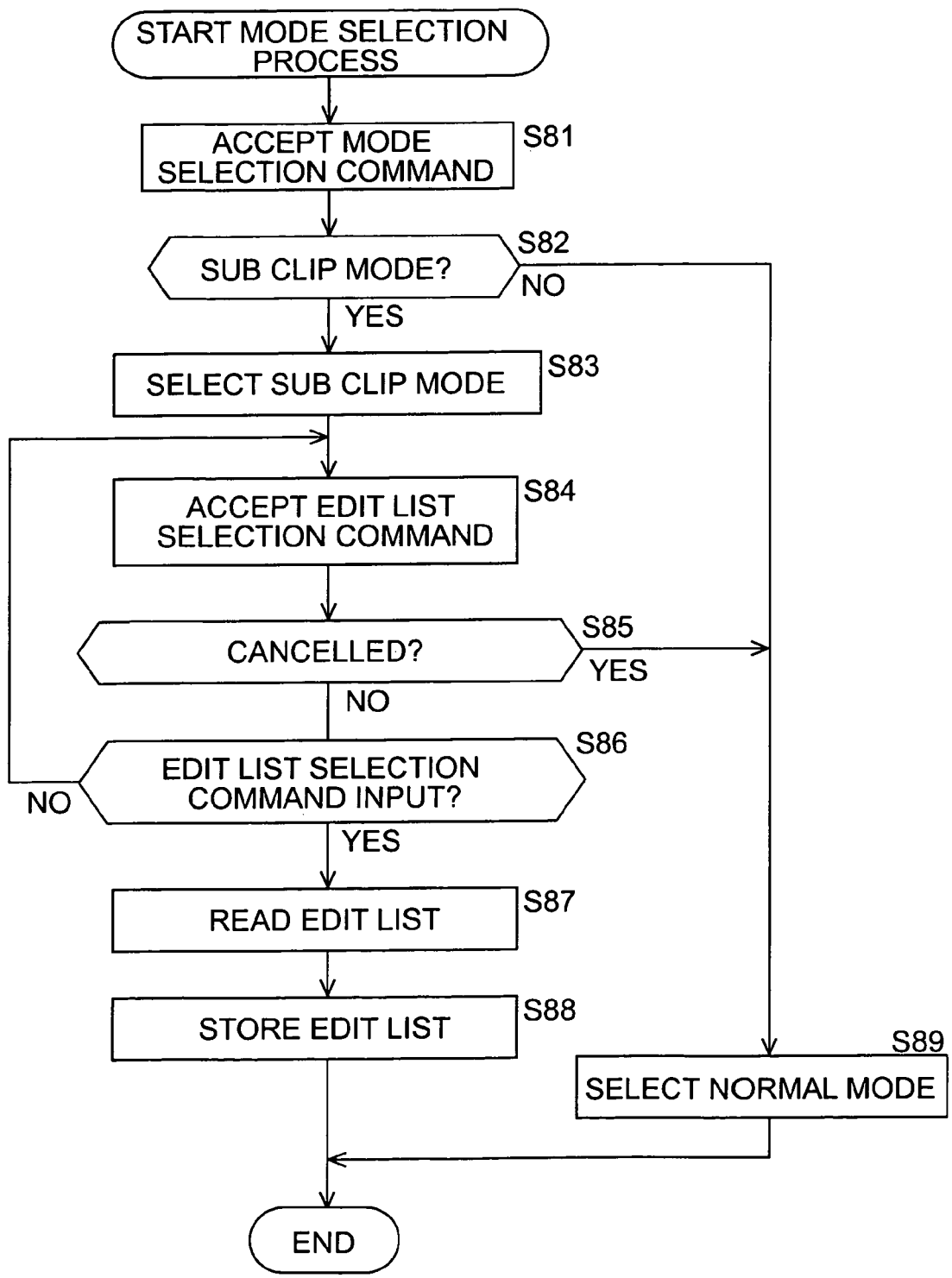
FIG. 24 is a flow chart showing an example of a mode selection process.

The details of the mode selection process in step S44 shown in FIG. 22 are described below with reference to a flow chart shown in FIG. 24.

If the mode selection process is started, in step S81, the mode designation command input unit 111 of the mode setting unit 103 accepts a mode designation command input via the input unit 101.

If the mode designation command is accepted, the mode designation command input unit 111 transfers the mode designation command to the mode selector 113.

In step S82, the mode selector 113 determines whether the operation mode designated by the mode designation command is the sub clip mode. If it is determined that the designated operation mode is the sub clip mode, the process proceeds to step S83. In step S83, the mode selector 113 selects the sub clip mode 122. The mode selector 113 supplies information indicating that the sub clip mode 122 has been selected to the sub clip processing unit 104, the clip processing unit 105, and the current edit list selector 115. Thereafter, the process proceeds to step S84.

In step S84, current edit list selector 115 accepts an edit list designation command input via the input unit 101. In step S85, the mode designation command input unit 111 determines, based on the command issued by the user via the input unit 101, whether the sub clip mode 122 has been canceled. If the sub clip mode 122 has not been canceled, the process proceeds to step S86.

In step S86, the current edit list selector 115 determines whether an edit list designation command has been input via the input unit 101. If the edit list designation command has not been input, the process returns to step S84, and the above-described process from step S84 is performed repeatedly until it is determined that the edit list designation command has been input.

If it is determined in step S86 that the edit list designation command has been input, the current edit list selector 115 supplies the input edit list designation command to the edit list manager 107. Thereafter, the process proceeds to step S87. In step S87, the edit list reading unit 172 of the edit list manager 107 reads the designated edit list from the optical disk 81 and supplies it to the edit list memory 171. In step S88, the edit list memory 171 stores the supplied edit list as the current edit list 174. If the storing of the current edit list 174 is completed, the mode selection process is ended.

In the case in which it is determined in step S82 that the mode designated by the mode designation command is not the sub clip mode, the mode selector 113 advances the process to step S89. On the other hand, in the case in which it is determined in step S85 that the sub clip mode 122 has been canceled, the mode designation command input unit 111 advances the process to step S89. In step S89, the mode selector 113 selects the normal mode and ends the mode selection process.

As described above, by performing the mode selection process, the camcorder 71 can set the operation mode even when no setting information 146 is recorded on the optical disk 81.

If the operation mode is set to the sub clip mode 122 via the setting process described above, the respective parts of the camcorder 71 operate such that clips recorded are added as sub clips in the edit list. The control of the operation in the sub clip mode 122 is described below with reference to flow charts shown in FIGS. 25 and 26.

In step S101, the clip detector 151 of the clip processing unit 105 detects a clip supplied from the image pickup unit 102. In step S102, the clip detector 151 determines, based on the detection result, whether movie shooting is started. If a clip is detected and thus it is determined that moving shooting has been started, the clip detector 151 supplies the image data of the detected clip to the display 154 to display the image thereon. Thereafter, the process proceeds to step S103.

In step S103, the input unit 101 accepts inputting of an essence mark. More specifically, while referring to the moving image displayed on the display 154, a user inputs via the input unit 101 an essence mark such as an IN point or an OUT point corresponding to a particular frame of the moving image, and the input unit 101 accepts the inputting of the essence mark. This makes it possible for the user to easily insert essence marks in the clip during the operation of recording the clip. The input unit 101 supplies the accepted input information to the meta data generator 152.

In step S104, the meta data generator 152 generates meta data associated with the clip based on the clip data supplied from the clip detector 151 and the input information supplied from the input unit 101. In a case in which there is an existing meta data associated with the clip data supplied from the clip detector 151, the meta data generator 152 replaces the meta data with the generated meta data, or adds the generated meta data as a new file. The meta data generator 152 supplies the meta data (or all clip data) to the sub clip processing unit 104 and also to the low resolution data generator 153.

In step S105, the low resolution data generator 153 generates a low-resolution version of the supplied clip data and supplies it together with the original clip data to the clip recording unit 108.

If the clip recording unit 108 receives the clip data, then in step S106, the clip recording unit 108 transfers the clip data to the drive 109 to record the clip data on the optical disk 81 mounted on the drive 109.

In step S107, the clip detector 151 determines whether the shooting is ended, based on the detection result of the supplied clip data. In a case in which the clip data is still being supplied, and thus it is determined that the shooting operation is not ended, the clip detector 151 returns the process to step S103 to repeat the process from step S103. On the other hand, in a case in which the supplying of the clip data is ended, and thus it is determined in step S107 that the shooting is ended, the clip detector 151 advances the process to step S108.

In step S108, the sub clip information generator 131 of the sub clip processing unit 104 generates sub clip information by performing the sub clip information generation process as described earlier with reference to the flow chart shown in FIG. 6. The sub clip information generator 131 supplies the generated sub clip information to the sub clip information registration unit 132.

If the sub clip information registration unit 132 receives the sub clip information, then in step S109, the sub clip information registration unit 132 registers the received sub clip information in the current edit list 174 stored in the edit list memory 171 of the edit list manager 107.

If the current edit list 174 is updated, the edit list writing unit 173 supplies the updated current edit list 174 to the drive 109 to record it on the optical disk 81.

After the sub clip processing unit 104 updates the current edit list, in step S111, the sub clip processing unit 104 updates the setting information 164 stored in the setting information memory 161 of the setting information manager 106. If the setting information 164 is updated, then in step S112 the setting information writing unit 163 supplies the updated setting information 164 to the drive 109 to record it on the optical disk 81. Thereafter, the process proceeds to step S121 shown in FIG. 26.

Figure 25:
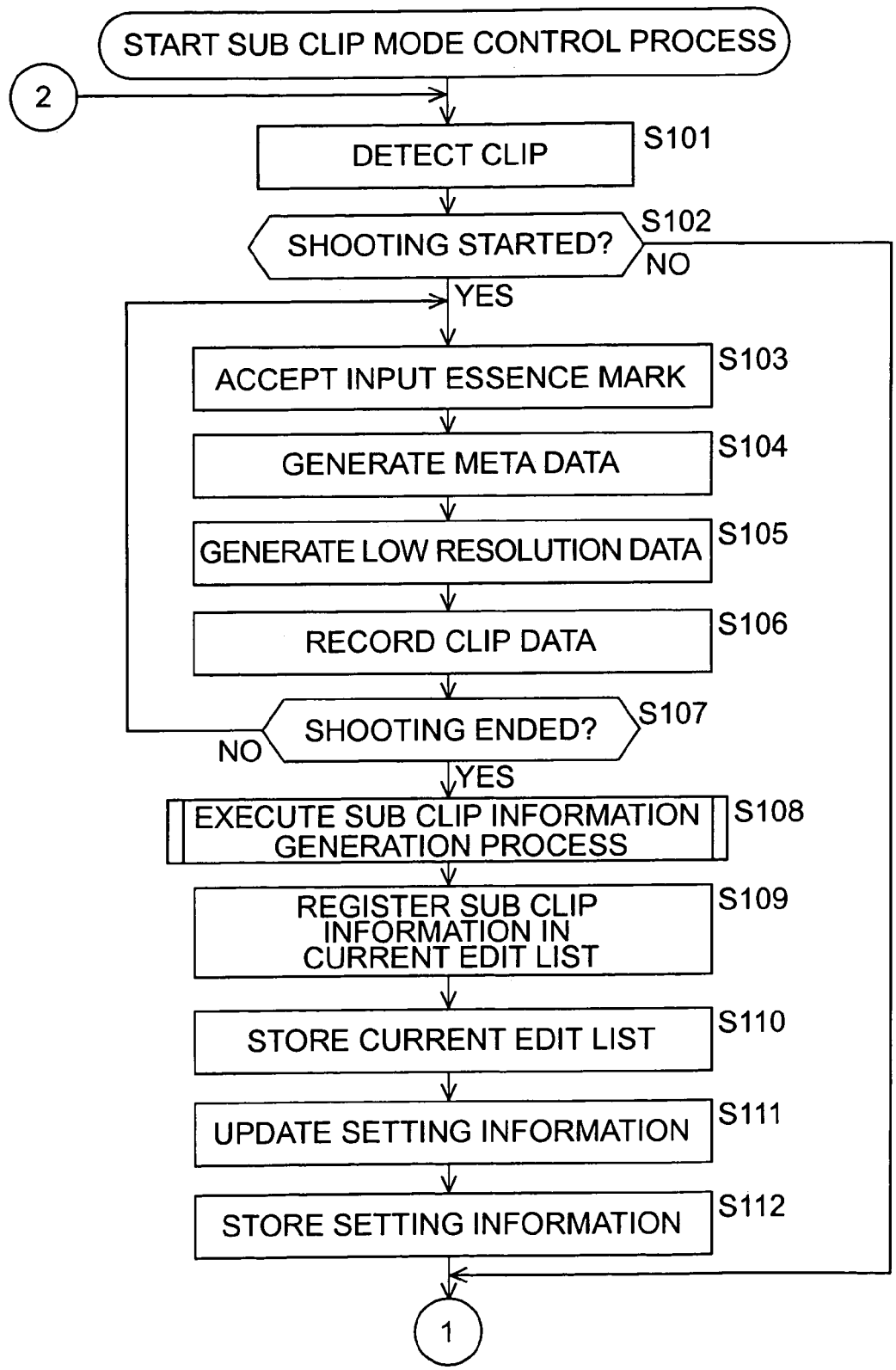
FIG. 25 is a flow chart showing an example of a sub clip mode control process.
Figure 26:
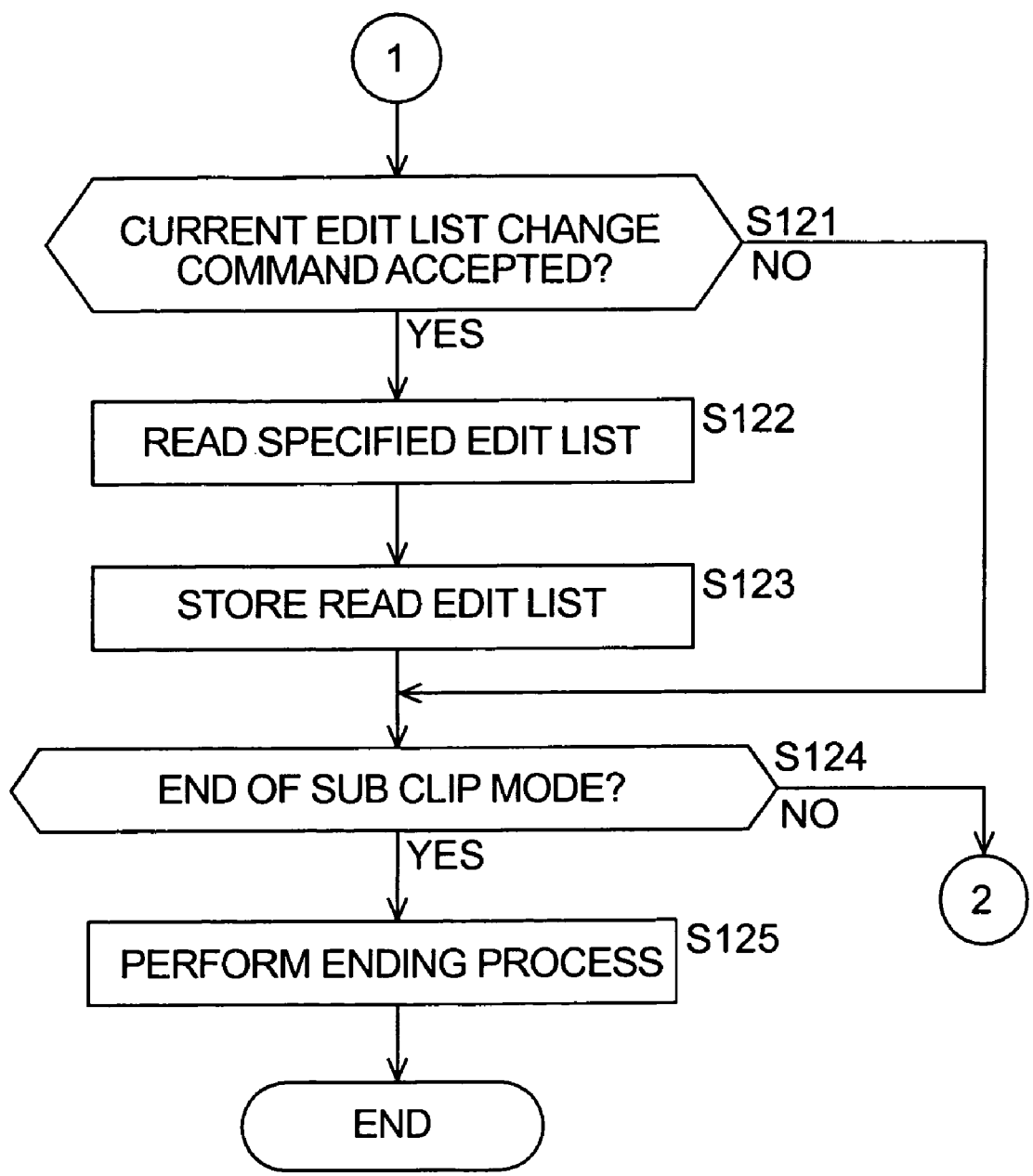
FIG. 26 is a flow chart of a part following the part shown in FIG. 25 showing the example of the sub clip mode control process.

On the other hand, in the case in which it is determined in step S102 in FIG. 25 that the shooting is not started, the clip detector 151 advances the process to step S121 shown in FIG. 26.

In step S121, the input unit 101 determines whether a command requesting changing of the current edit list 174 in which clips are registered is issued. If it is determined that a user has issued, via the input unit 101, the command to change the current edit list 174, the input unit 101 informs the edit list manager 107 that the command has been issued. Thereafter, the process proceeds to step S122.

In step S122, the edit list reading unit 172 reads the specified edit list from the optical disk 81 mounted on the drive 109 and supplies the read edit list to the edit list memory 171. In step S123, the edit list memory 171 stores the supplied edit list as the current edit list 174. After the new edit list is stored in the edit list memory 171, the process proceeds to step S124.

In the case in which it is determined in step S121 that the command requesting the change of the current edit list is not issued, the input unit 101 skips steps S122 and S123 and advances the process to step S124.

In step S124, the mode selector 113 of the mode setting unit 103 determines whether to end the sub clip mode 122. If it is determined that the sub clip mode 122 should not be ended, the process returns to step S101 shown in FIG. 25 to repeat the process from step S101.

In the case in which the mode designation command input unit 111 receives a sub clip mode end command issued by a user via the input unit 101 and thus it is determined in step S124 in FIG. 26 that the sub clip mode 122 should be ended, the mode selector 113 advances the process to step S125 to perform an ending process including notifying various parts of the end of the sub clip mode. Thus, the operation in the sub clip mode is ended.

As described above, via the sub clip mode control process, the camcorder 71 is capable of not only performing a recording operation in which clips obtained via a shooting operation are simply recorded on the optical disk 81, but also performing a nondestructive editing process on the clips obtained via the shooting such that a result of editing is described in the form of an edit list and the resultant edit list is recorded together with the clips on the optical disk 81. This makes it possible for an apparatus using this optical disk 81 to easily detect, from the edit list, which clip is used at which position in the editing, that is, it is possible to easily identify which clip corresponds to which cut of which scene.

It is also possible to detect IN points and OUT points from the edit list. Therefore, the apparatus can easily identify a particular part of each clip intended by a cameraman. Furthermore, use of the edit list makes it possible to easily identify correct relative locations of respective clips in a playback operation even when clips should be played back in an order different from the order in which the clips were recorded, and thus it is possible to play back the clips in the correct order.

As described above, the camcorder 71 according to the present invention is capable of recording clips, obtained via shooting operations, in a nondestructively edited form that allows a user to manage a plurality of image data in an arbitrarily edited form and thus allows the user to easily manage a large number of image data having complicated relationships.

The process performed by the recorder 72 in the program production support system 61 shown in FIG. 7 is basically similar to the process performed by the camcorder 71, which has been described above with reference to the flow charts, except that clip data is input in a different manner. Thus, the recorder 72 also provides advantages similar to those of the camcorder 71. However, in the case of the recorder 72, step S102 in the flow chart shown in FIG. 25 is performed such that starting of inputting of data from the outside is detected instead of detecting starting of a shooting operation, and step S107 is performed such that ending of inputting of data from the outside is detected instead of detecting ending of the shooting operation.

Now, an editing process performed by the editing apparatus 73 using the optical disk 81 on which clips are recorded in the above described manner is described below.

Figure 27:
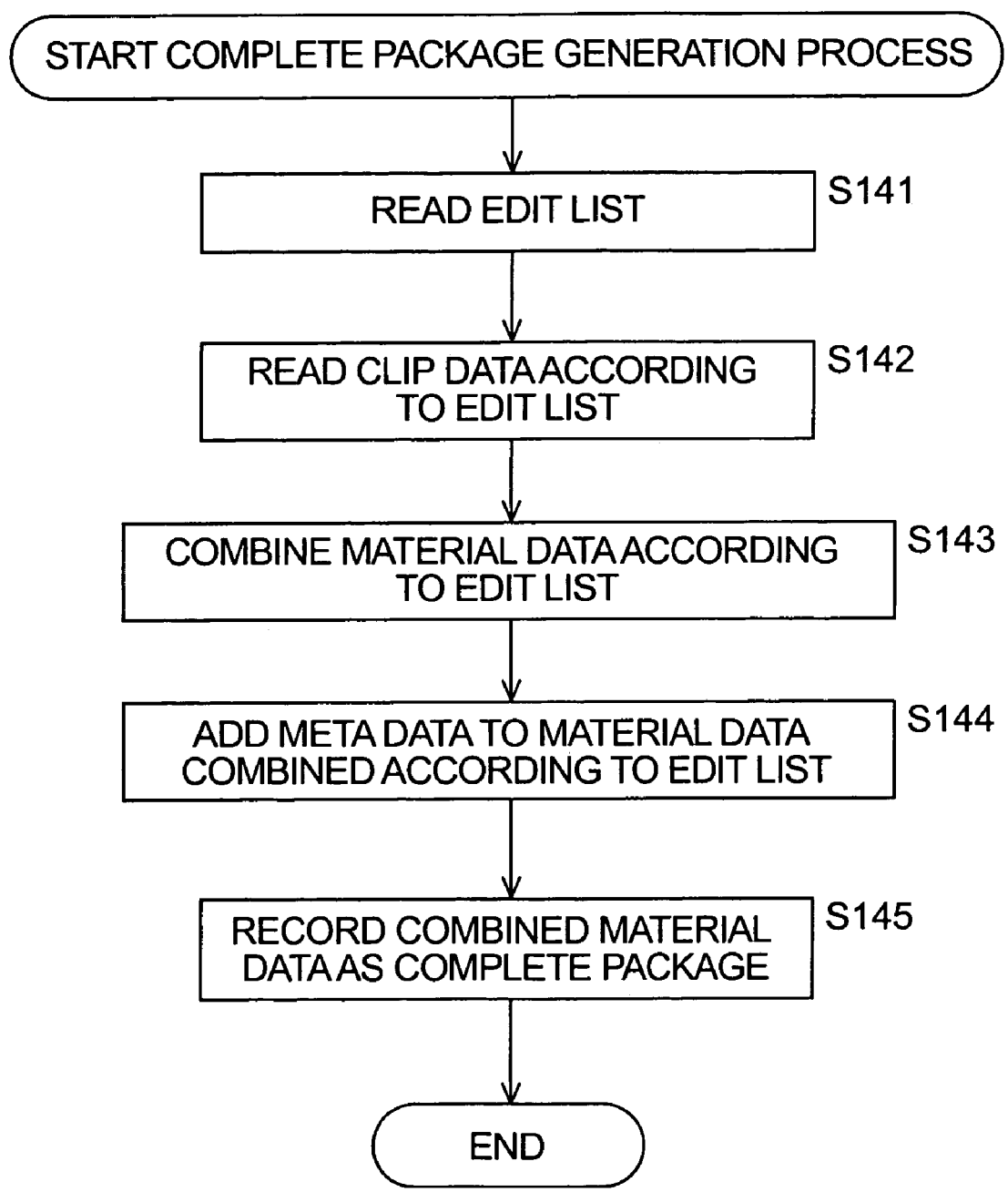
FIG. 27 is a flow chart showing an example of a complete package generation process.

The editing apparatus 73 reads the edit list stored on the optical disk 81 mounted on the drive 271 and generates complete package data from clips recorded on the optical disk 81 in accordance with the edit list. The process of generating the complete package is described in further detail below with reference to a flow chart shown in FIG. 27.

If the complete package generation process is started, then in step S141 the reading unit 274 of the editing apparatus 73 reads an edit list stored on the optical disk 81. In a case in which a plurality of edit lists are stored on the optical disk 81, the reading unit 274 reads an edit list selected in accordance with a predetermined selection rule. For example, the reading unit 274 reads an edit list selected by a user, an edit list specified by the setting information 164 stored on the optical disk 81, or a latest edit list.

The reading unit 274 supplies the read edit list to the complete package generator 275. In step S142, in accordance with the edit list, the reading unit 274 reads clip data of clips registered as sub clips in the edit list from the optical disk 81 and supplies the read clip data to the complete package generator 275. In step S143, after receiving the edit list and the clip data, the complete package generator 275 performs an editing process including combining and connecting material data (image data and audio data) of clip data in accordance with the edit list.

In step S144, the complete package generator 275 attaches meta data such as time codes to the combined material data in accordance with the edit list. In step S145, the complete package generator 275 supplies the combined material data with the attached meta data, as complete package data, to the writing unit 273 to record the data on the optical disk 81. The writing unit 273 supplies the received complete package data to the drive 271, which records it on the optical disk 81. If the recording of the complete package data is completed, the complete package generation process is ended.

In step S145 described above, the complete package generator 275 may supply the generated complete package data to the playback unit 277 to play back the complete package data or may supply the generated complete package data to the data outputting unit 278 to output it to the outside of the editing apparatus 73.

By performing the complete package generation process as described above, the editing apparatus 73 is capable of easily generating complete package data as a result of editing clips recorded on the optical disk 81 in accordance with an edit list recorded on the optical disk 81. This allows a user to easily recognize relationships among clips and manage a large number of clips having complicated relationships.

The editing apparatus 73 also generates (edits) a grouping list indicating groups of clips recorded on the optical disk 81, from the edit list recorded on the optical disk 81 mounted on the drive 271. The process of editing the grouping list is described in detail with reference to a flow chart shown in FIG. 28.

In the first step S161 in the grouping list editing process, the input unit 272 of the editing apparatus 73 accepts designation of an edit list to be reflected in a grouping list. If a user designates an edit list, the input unit 272 supplies information indicating the designated edit list to the grouping list editor 276.

In step S162, the input unit 272 accepts designation of a group to be edited.

If a group is designated, the input unit 272 supplies information indicating the designated group to the grouping list editor 276.

In step S163, under the control of the grouping list editor 276, the reading unit 274 reads the designated edit list and supplies it to the grouping list editor 276. In step S164, in response to receiving the edit list, the grouping list editor 276 extracts material information (associated with sub clips) from the edit list.

In step S165, the grouping list editor 276 determines whether the designated group is a new group. In the case in which it is determined that a new group is designated, the process proceeds to step S166. In step S166, the grouping list editor 276 generates a new material group 294. In step S167, the grouping list editor 276 registers the material information extracted from the edit list in the new material group 294 and supplies it to the writing unit 273. In step S168, the writing unit 273 supplies the received new material group 294 to the drive 271, which records the supplied new material group 294 on the optical disk 81. If the writing unit 273 completes the recording of the new material group 294, the grouping list editing process is ended.

In the case in which it is determined in step S165 that the designated group is an existing group, the grouping list editor 276 advances the process to step S169. In step S169, under the control of the grouping list editor 276, the reading unit 274 reads designated material group 294 (information associated with the material group 294) from the optical disk 81 mounted on the drive 271 and supplies the read material group 294 to the grouping list editor 276. In step S170, the grouping list editor 276 additionally registers the material information extracted from the edit list in the material group 294 and supplies the resultant material group 294 to the writing unit 273. In step S171, the writing unit 273 supplies the updated material group 294 to the drive 271 to record it on the optical disk 81. If the writing unit 273 completes the recording of the updated material group 294, the grouping list editing process is ended.

By performing the grouping list editing process in the above-described manner, the editing apparatus 73 is capable of generating a grouping list indicating groups of clips from the edit list indicating the editing result. This makes it possible for a user to easily perform an editing process including selecting clips to be used in a complete package from a plurality of clips by referring to the grouping list. For example, in the editing process, the user can easily select takes to be used in a complete package from a plurality of takes that were shot for the same cut of a scenario.

As described above, the camcorder 71 and the recorder 72 according to the present invention allow a user to manage a plurality of image data in a desired edited form when clips are recorded or when recorded clips are nondestructively edited. The editing apparatus 73 according to the present invention allows a user to easily performing an editing process such as generating of complete package data or a grouping list from an edit list.

Each of the camcorder 71, the recorder 72, and the editing apparatus 73 may be constructed so as to include a plurality of parts (apparatus) providing different functions or may be constructed such that all functions are integrated in a single apparatus. Each of the camcorder 71, the recorder 72, and the editing apparatus 73 may provide an additional function other than the functions described above.

The sequence of processing steps described above may be performed by means of hardware or software. When the sequence of processing steps described above is performed by means of software, the editing apparatus 1 shown in FIG. 1, or the camcorder 71, the recorder 72, or the editing apparatus 73 shown in FIG. 7 may be implemented on a personal computer such as that shown in FIG. 29.

Figure 29:
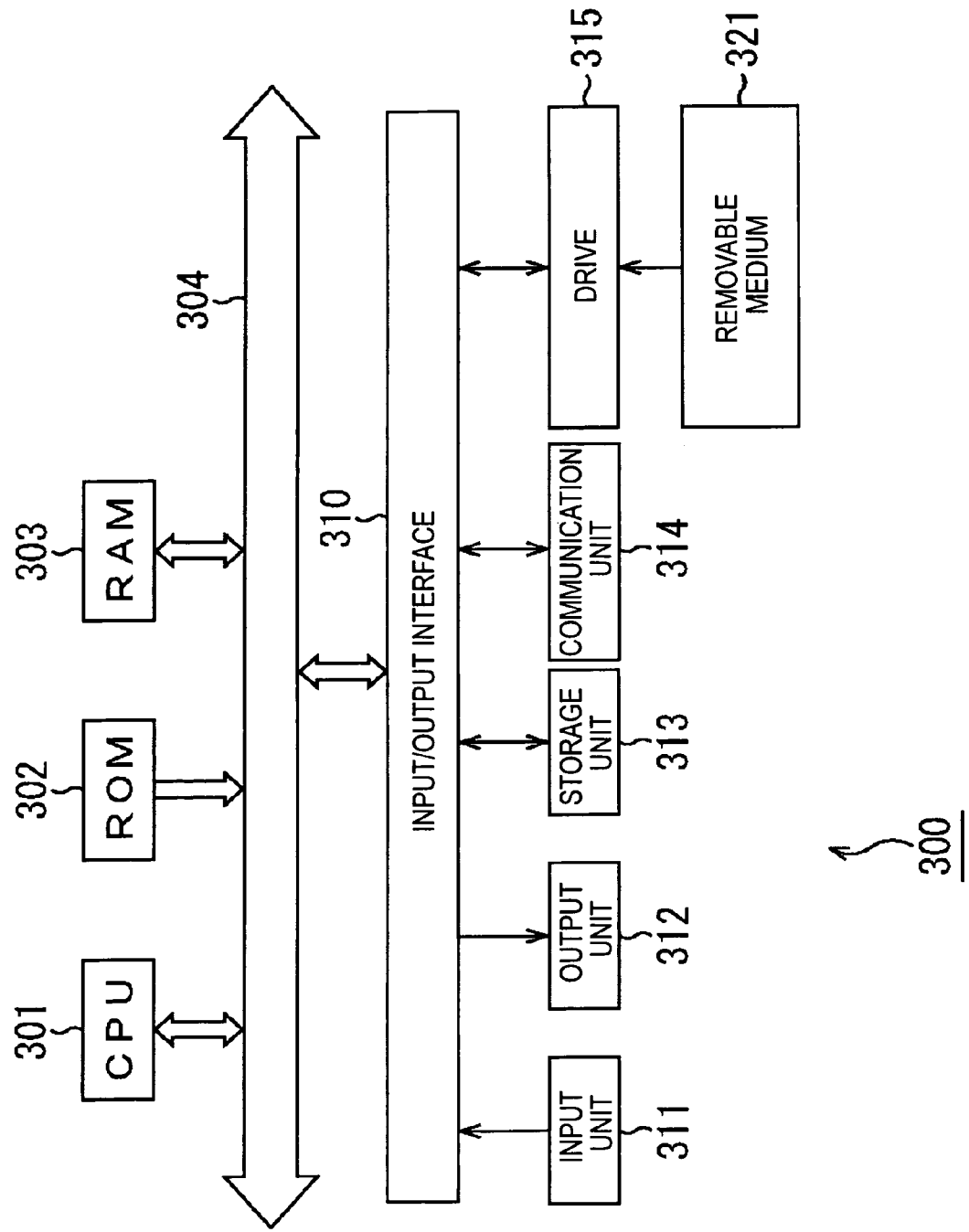
FIG. 29 is a block diagram showing an example of a configuration of a personal computer according to the present invention.

In the personal computer 300 shown in FIG. 29, a CPU (Central Processing Unit) 301 executes various processes in accordance with a program stored in a ROM (Read Only Memory) 302 or a program loaded from a storage unit 313 into a RAM (Random Access Memory) 303. The RAM 303 is also used to store data used by the CPU 301 in the execution of various processes.

The CPU 301, the ROM 302, and the RAM 303 are connected to each other via a bus 304. The bus 304 is also connected to an input/output interface 310.

The input/output interface 310 is also connected to an input unit 311 including a keyboard, a mouse, and the like, an output unit 312 including a display such as a CRT (Cathode Ray Tube) or a LCD (Liquid Crystal Display) and a speaker, a storage unit 313 such as a hard disk, and a communication unit 314 such as a modem. The communication unit 314 serves to perform communication via a network such as the Internet.

Furthermore, the input/output interface 310 is also connected to a drive 315, as required. A removable storage medium 321 such as a magnetic disk, an optical disk, a magnetooptical disk, or a semiconductor memory is mounted on the drive 315 as required, and a computer program is read from the removable storage medium 321 and installed into the storage unit 313, as required.

When the processing sequence is executed by software, a program forming the software may be installed from a storage medium or via a network onto a computer.

An example of such a storage medium usable for the above purpose is a removable medium, such as the removable medium 321 shown in FIG. 29, on which a program is stored and which is supplied to a user separately from a computer. Specific examples include a magnetic disk (such as a floppy disk), an optical disk (such as a CD-ROM (Compact Disk-Read Only Memory) and a DVD (Digital Versatile Disk)), a magnetooptical disk (such as a MD (Mini-Disk, trademark)), and a semiconductor memory. A program may also be supplied to a user by preinstalling it on a built-in ROM 302 or a storage unit 313 such as a hard disk disposed in the computer.

In the present specification, the steps described in the program stored in the storage medium may be performed either in time sequence in accordance with the order described in the program or in a parallel or separate fashion.

In the present specification, the term "system" is used to describe the whole of a plurality of apparatus.

The invention claimed is:

1. An information processing apparatus for processing content data, comprising:
   means for capturing a video clip of a subject as the content data; a memory configured to store the content data;
   means for accepting input from a user designating an essence mark of the video clip while the video clip is being captured;
   means for generating information associated with the content data; and means for registering the information associated with the content data generated by the means for generating information in an edit list indicating a result of editing of the content data,
   wherein the means for generating information includes
      means for generating content data identification information identifying the content data;
      means for generating time code information indicating a time code for use in the edit list, the time code being assigned to the content data; and
      means for generating information representing the essence mark that is meta data information that includes both clip begin and clip end time position information and is assigned to a frame image of the content data, and
   wherein the means for registering registers as a unit of clip meta data in the edit list, content data information including the content data identification information generated by the means for generating content data identification information, the time code information generated by the means for generating time code information, and the essence mark information generated by the means for generating information representing the essence mark, the essence mark information being a separate and distinct data field from the time code information.

2. The information processing apparatus according to claim 1, further comprising:
   means for storing the edit list,
   wherein the means for registering registers information associated with the content data in the edit list stored in the means for storing.

3. The information processing apparatus according to claim 1, further comprising:
   means for recording information on a storage medium,
   wherein the means for recording records, on the storage medium, content data whose associated information has been registered in the edit list by the means for registering.

4. The information processing apparatus according to claim 3, wherein the means for recording further records, on the storage medium, the edit list in which information associated with the content data is registered.

5. The information processing apparatus according to claim 1, further comprising:
   means for accepting inputting of the content data,
   wherein the means for generating information generates information associated with the content data accepted by the means for accepting.

6. An information processing method for an information processing apparatus to process content data, comprising:
   capturing a video clip of a subject as the content data;
   accepting input from a user designating an essence mark of the video clip while the video clip is being captured;
   generating content data information associated with the content data; and
   registering information associated with the content data generated in the content data information generation step in an edit list indicating a result of editing of the content data,
   wherein the generating step includes
      generating content data identification information identifying the content data;
      generating time code information indicating a time code for use in the edit list, the time code being assigned to the content data; and
      generating information representing the essence mark that is meta data information that includes both clip begin and clip end time position information and is assigned to a frame image of the content data, and
   wherein the registering step includes registering, as a unit of clip meta data in the edit list, content data information including the content data identification information, the time code information, and the essence mark information, the essence mark information being a separate and distinct data field from the time code information.

7. A computer readable storage medium including program instructions, which when executed by a computer cause the computer to perform processing associated with content data by performing the steps of:
   capturing a video clip of a subject as the content data;
   accepting input from a user designating an essence mark of the video clip while the video clip is being captured;
   generating content data information associated with the content data; and
   registering information associated with the content data generated in the content data information generation step, in an edit list indicating a result of editing of the content data,
   wherein the generating step includes
      generating content data identification information identifying the content data;
      generating time code information indicating a time code for use in the edit list, the time code being assigned to the content data; and
      generating information representing the essence mark that is meta data information that includes both clip begin and clip end time position information and is assigned to a frame image of the content data, and wherein the registering step includes registering, as a unit of clip meta data in the edit list, content data information including the content data identification information, the time code information, and the essence mark information, the essence mark information being a separate and distinct data field from the time code information.

* * * * *